United States Patent
Choi et al.

(10) Patent No.: US 10,623,777 B2
(45) Date of Patent: Apr. 14, 2020

(54) IMAGE ENCODING METHOD AND APPARATUS, AND IMAGE DECODING METHOD AND APPARATUS

(71) Applicant: SAMSUNG ELECTRONICS CO., LTD., Suwon-si (KR)

(72) Inventors: Na-rae Choi, Seoul (KR); Min-woo Park, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 69 days.

(21) Appl. No.: 16/077,346

(22) PCT Filed: Feb. 16, 2017

(86) PCT No.: PCT/KR2017/001697
§ 371 (c)(1),
(2) Date: Aug. 10, 2018

(87) PCT Pub. No.: WO2017/142319
PCT Pub. Date: Aug. 24, 2017

(65) Prior Publication Data
US 2019/0052909 A1 Feb. 14, 2019

Related U.S. Application Data

(60) Provisional application No. 62/295,676, filed on Feb. 16, 2016.

(51) Int. Cl.
*G06K 9/36* (2006.01)
*H04N 19/70* (2014.01)
(Continued)

(52) U.S. Cl.
CPC .............. *H04N 19/70* (2014.11); *H04N 19/11* (2014.11); *H04N 19/122* (2014.11);
(Continued)

(58) Field of Classification Search
CPC ...... H04N 19/70; H04N 19/467; H04N 19/11; H04N 19/176; H04N 19/18; H04N 19/463;
(Continued)

(56) References Cited

U.S. PATENT DOCUMENTS 8,498,337 B2   7/2013  Park et al.
9,654,805 B2   5/2017  Henry et al.
(Continued)

FOREIGN PATENT DOCUMENTS

JP         3593988 B2      11/2004
KR     10-2008-0053336 A    6/2008
(Continued)

OTHER PUBLICATIONS

International Search Report (PCT/ISA/210) dated May 29, 2017 issued by the International Searching Authority in International Application No. PCT/KR2017/001697.
(Continued)

*Primary Examiner* — Andrew M Moyer
(74) *Attorney, Agent, or Firm* — Sughrue Mion, PLLC

(57) ABSTRACT

Provided are an image encoding/decoding apparatus and method using data hiding, in which, when a difference between scan positions of a final effective transform coefficient and an initial effective transform coefficient of a sub-block of a current transform unit is greater than a threshold value, an intra-prediction direction of a current coding unit is determined using parity of the sum of transform coefficients of the sub-block corresponding to certain scan positions or a level of an effective transform coefficient among transform coefficients of the sub-block is corrected such that the parity of the sum of the transform coefficients indicates the intra-prediction direction of the current coding unit. Encoding and decoding efficiencies may be improved (Continued)

by reducing a bitrate by using a method of hiding data in parity of effective transform coefficients.

14 Claims, 23 Drawing Sheets

(51) Int. Cl.
    *H04N 19/184*     (2014.01)
    *H04N 19/463*     (2014.01)
    *H04N 19/18*     (2014.01)
    *H04N 19/176*     (2014.01)
    *H04N 19/11*     (2014.01)
    *H04N 19/467*     (2014.01)
    *H04N 19/122*     (2014.01)
    *H04N 19/129*     (2014.01)
    *H04N 19/593*     (2014.01)

(52) U.S. Cl.
    CPC ......... *H04N 19/129* (2014.11); *H04N 19/176* (2014.11); *H04N 19/18* (2014.11); *H04N 19/184* (2014.11); *H04N 19/463* (2014.11); *H04N 19/467* (2014.11); *H04N 19/593* (2014.11)

(58) Field of Classification Search
    CPC .. H04N 19/184; H04N 19/129; H04N 19/122; H04N 19/593
    USPC .................................................. 382/232–253
    See application file for complete search history.

(56) References Cited

U.S. PATENT DOCUMENTS

| | | |
|---|---|---|
| 9,832,477 B2 | 11/2017 | Jeong et al. |
| 2011/0268183 A1* | 11/2011 | Sole ........................ H04N 19/70 375/240.03 |
| 2015/0117548 A1 | 4/2015 | Lee et al. |
| 2015/0139303 A1* | 5/2015 | Sato ..................... H04N 19/467 375/240.03 |
| 2018/0262777 A1* | 9/2018 | Filippov ................ H04N 19/60 |

FOREIGN PATENT DOCUMENTS

| | | |
|---|---|---|
| KR | 10-2013-0087294 A | 8/2013 |
| KR | 10-2015-0047332 A | 5/2015 |
| KR | 10-2015-0048437 A | 5/2015 |
| KR | 10-2015-0055104 A | 5/2015 |

OTHER PUBLICATIONS

Written Opinion (PCT/ISA/237) dated May 29, 2017 issued by the International Searching Authority in International Application No. PCT/KR2017/001697.

* cited by examiner

FIG. 11
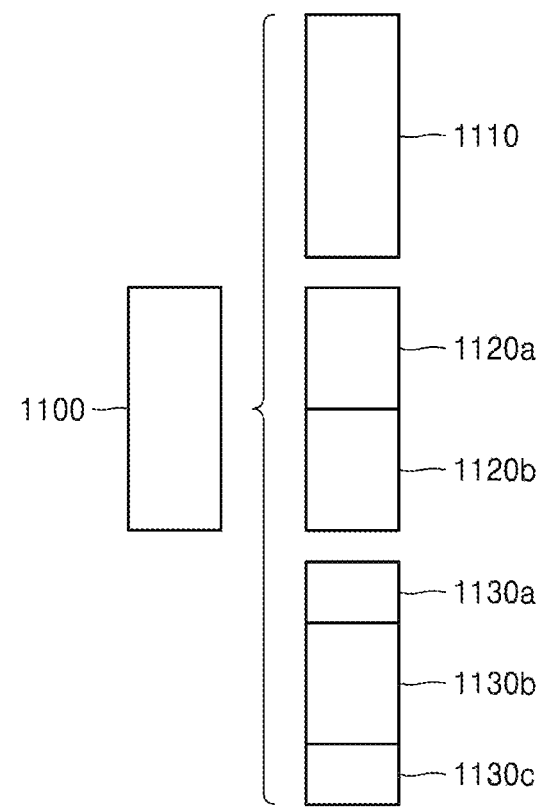
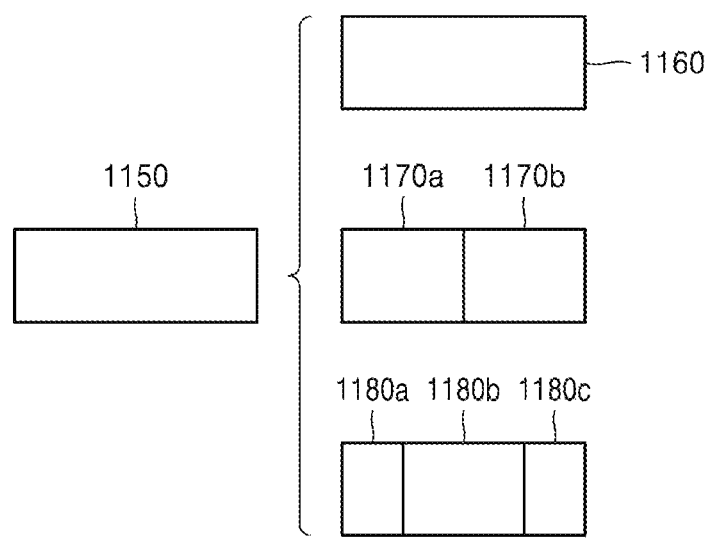

FIG. 20

| BLOCK TYPE / DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

IMAGE ENCODING METHOD AND APPARATUS, AND IMAGE DECODING METHOD AND APPARATUS

TECHNICAL FIELD

The present disclosure relates to an image encoding/decoding apparatus and method using data hiding.

BACKGROUND ART

Image data is encoded using a codec according to a data compression standard, e.g., a Moving Picture Experts Group (MPEG) standard, and recorded on a recording medium in the form of a bitstream or transmitted via a communication channel.

With the development and supply of hardware for reproducing and storing high-resolution or high-quality image content, there is a growing need for a codec for effectively encoding or decoding the high-resolution or high-quality image content. Encoded image content may be reproduced by decoding it. Recently, methods of effectively compressing such high-resolution or high-quality image content have been implemented.

DESCRIPTION OF EMBODIMENTS

Technical Problem

A process of encoding an image includes a process of transmitting encoding information in a bitstream. Accordingly, a bitrate needs to be minimized via effective prediction.

Solution to Problem

According to an aspect of the present disclosure, a method of decoding an image includes partitioning the image into at least one coding unit; partitioning a current coding unit into at least one transform unit; when a difference between scan positions of a final effective transform coefficient and an initial effective transform coefficient of a sub-block of a current transform unit is greater than a threshold value, determining an intra-prediction direction of the current coding unit by using parity of the sum of effective transform coefficients of the sub-block corresponding to certain scan positions; and when the difference is equal to or less than the threshold value, obtaining a syntax element indicating the intra-prediction direction from a bitstream.

According to another aspect of the present disclosure, an apparatus for decoding an image includes a decoder configured to partition an image into at least one coding unit, partition a current coding unit into at least one transform unit, and determine an intra-prediction direction of the current coding unit by using parity of the sum of transform coefficients of a sub-block of a current transform unit corresponding to certain scan positions when a difference between scan positions of a final effective transform coefficient and an initial effective transform coefficient of the sub-block of the current transform unit is greater than a threshold value; and a bitstream obtainer configured to obtain a syntax element indicating the intra-prediction direction from a bitstream when the difference is equal to or less than the threshold value.

According to another aspect of the present disclosure, a method of encoding an image includes partitioning the image into at least one coding unit; partitioning a current coding unit into at least one transform unit; correcting a level of an effective transform coefficient among the at least one transform unit such that parity of the sum of transform coefficients of a sub-block of a current transform unit corresponding to certain scan positions indicates an intra-prediction direction of the current coding unit, when a difference between scan positions of a final effective transform coefficient and an initial effective transform coefficient of the sub-block of the current transform unit is greater than a threshold value; and generating a bitstream including a syntax element indicating the intra-prediction direction when the difference is equal to or less than the threshold value.

According to another aspect of the present disclosure, an apparatus for encoding an image includes an encoder configured to partition the image into at least one coding unit, partition a current coding unit into at least one transform unit, and correct a level of an effective transform unit among the at least one transform unit such that parity of the sum of transform coefficients of a sub-block of a current transform unit corresponding to certain scan positions indicates an intra-prediction direction of the current coding unit, when a difference between scan positions of a final effective transform coefficient and an initial effective transform coefficient of the sub-block of the current transform unit is greater than a threshold value; and a bitstream generator configured to generate a bitstream including a syntax element indicating the intra-prediction direction when the difference is equal to or less than the threshold value.

Advantageous Effects of Disclosure

Encoding and decoding efficiencies can be improved by reducing a bitrate by using a method of hiding data by parity of effective transform coefficients.

BRIEF DESCRIPTION OF DRAWINGS

FIG. 11 illustrates processes of determining at least one coding unit when a coding unit having a non-square shape is partitioned, according to an embodiment.

FIG. 20 illustrates processes of determining a depth of a coding unit as a shape and size of the coding unit are changed, when a plurality of coding units are determined when the coding unit is recursively partitioned, according to an embodiment.

BEST MODE

Figure 1:
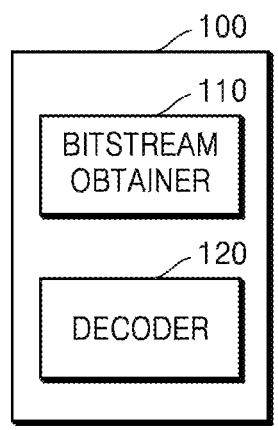
FIG. 1 is a block diagram of an image decoding apparatus according to an embodiment.

Provided is an image decoding method including partitioning the image into at least one coding unit; partitioning a current coding unit into at least one transform unit; when a difference between scan positions of a final effective transform coefficient and an initial effective transform coefficient of a sub-block of a current transform unit is greater than a threshold value, determining an intra-prediction direction of the current coding unit by using parity of the sum of effective transform coefficients of the sub-block corresponding to certain scan positions; and when the difference is equal to or less than the threshold value, obtaining a syntax element indicating the intra-prediction direction from a bitstream.

In the image decoding method, the sub-block may be lastly scanned among at least one sub-block included in the current transform unit.

In the image decoding method, the current transform unit may be first decoded among the at least one transform unit partitioned from the current coding unit.

In the image decoding method, the certain scan positions may be determined based on an order of scanning transform coefficients included in the sub-block.

In the image decoding method, when the difference is greater than a first threshold value and a number of the effective transform coefficients of the sub-block is greater than a second threshold value, the intra-prediction direction may be determined using the parity of the sum, and when the difference is equal to or less than the first threshold value or the number is equal to or less than the second threshold value, the syntax element indicating the intra-prediction direction may be obtained from the bitstream.

In the image decoding method, when the difference is greater than the threshold value, part of the syntax indicating the intra-prediction direction may be determined using the parity of the sum, and a remaining part of the syntax element may be obtained from the bitstream.

In the image decoding method, when the difference is greater than the threshold value, a part of the syntax element indicating the intra-prediction direction may be determined using parity of the sum of effective transform coefficients of the sub-block corresponding to even-numbered scan positions, and a remaining part of the syntax element may be determined using parity of the sum of effective transform coefficients of the sub-block corresponding to odd-numbered scan positions.

The image decoding method may further include determining a transformation type of the current transform unit by using the parity of the sum when the difference is greater than the threshold value; and obtaining a syntax element indicating a transformation type of the current transform unit from the bitstream when the difference is equal to or greater than the threshold value.

The image decoding method may further include obtaining a syntax element indicating a sign of the initial effective transform coefficient of the sub-block from the bitstream when the difference is equal to or less than the threshold value, and determining the sign of the initial effective transform coefficient by using the parity of the sum when the difference is greater than threshold value.

In the image decoding method, the certain scan positions may not include the scan position of the initial effective transform coefficient.

In the image decoding method, when the difference is greater than the threshold value, the intra-prediction direction may be determined using parity of the sum of effective transform coefficients of the sub-block corresponding to even-numbered scan positions, and the sign of the initial effective transform coefficient may be determined using parity of the sum of effective transform coefficients of the sub-block corresponding to odd-numbered scan positions.

In the image decoding method, when the difference is greater than the threshold value, the sign of the initial effective transform coefficient may be determined based on parity of a level of the initial effective transform coefficient.

Provided is an image decoding apparatus including a decoder configured to partition an image into at least one coding unit, partition a current coding unit into at least one transform unit, and determine an intra-prediction direction of the current coding unit by using parity of the sum of transform coefficients of a sub-block of a current transform unit corresponding to certain scan positions when a difference between scan positions of a final effective transform coefficient and an initial effective transform coefficient of the sub-block of the current transform unit is greater than a threshold value; and a bitstream obtainer configured to obtain a syntax element indicating the intra-prediction direction from a bitstream when the difference is equal to or less than the threshold value.

Provided is an image encoding method including partitioning the image into at least one coding unit; partitioning a current coding unit into at least one transform unit; correcting a level of an effective transform coefficient among the at least one transform unit such that parity of the sum of transform coefficients of a sub-block of a current transform unit corresponding to certain scan positions indicates an intra-prediction direction of the current coding unit, when a difference between scan positions of a final effective transform coefficient and an initial effective transform coefficient of the sub-block of the current transform unit is greater than a threshold value; and generating a bitstream including a syntax element indicating the intra-prediction direction when the difference is equal to or less than the threshold value.

Provided is an image encoding apparatus including an encoder configured to partition the image into at least one coding unit, partition a current coding unit into at least one transform unit, and correct a level of an effective transform unit among the at least one transform unit such that parity of the sum of transform coefficients of a sub-block of a current transform unit corresponding to certain scan positions indicates an intra-prediction direction of the current coding unit, when a difference between scan positions of a final effective transform coefficient and an initial effective transform coefficient of the sub-block of the current transform unit is greater than a threshold value; and a bitstream generator configured to generate a bitstream including a syntax element indicating the intra-prediction direction when the difference is equal to or less than the threshold value.

Mode of Disclosure

Advantages and features of the present disclosure and methods of achieving them will be apparent from embodiments set forth herein in conjunction with the accompanying drawings. However, the present disclosure is not limited to these embodiments and may be embodied in many different forms. These embodiments are merely provided so that this disclosure will be thorough and complete and will fully convey the scope of the present disclosure to those of ordinary skill in the art.

The terms used herein will be briefly described and then the present disclosure will be described in detail.

In the present disclosure, general terms that have been widely used nowadays are selected, if possible, in consideration of functions of the present disclosure, but non-general terms may be selected according to the intentions of technicians in the art, precedents, or new technologies, etc.

Some terms may be arbitrarily chosen by the present applicant. In this case, the meanings of these terms will be explained in corresponding parts of the present disclosure in detail. Thus, the terms used herein should be defined not based on the names thereof but based on the meanings thereof and the whole context of the present specification.

As used herein, the singular forms "a", "an" and "the" are intended to include the plural forms as well, unless the context clearly indicates otherwise It will be understood that when an element is referred to as including another element, the element can further include other elements unless mentioned otherwise. The term "unit" used herein should be understood as software or a hardware component, such as a FPGA or an ASIC, which performs certain functions. However, the term "unit" is not limited to software or hardware. The term "unit" may be configured to be stored in an addressable storage medium or to reproduce one or more processors. Thus, for example, the term "unit" may include components, such as software components, object-oriented software components, class components, and task components, functions, attributes, procedures, subroutines, segments of program code, drivers, firmware, microcode, a circuit, data, database, data structures, tables, arrays, and variables. Functions provided in components and "units" may be combined to obtain a small number of components and "units" or divided into sub-components and "sub-units".

Hereinafter, the term "image" should be understood to include a static image, such as a still image of a video, and a moving picture, i.e., a dynamic image, which is a video.

The term "sample" should be understood as data allocated to a video sampling position, i.e., data to be processed. For example, pixel values of an image in a spatial domain and transform coefficients in a transformation domain may be samples. A unit including such at least one sample may be defined as a block.

Embodiments of the present disclosure will be described in detail below such that those of ordinary skill in the art can easily implement them. In the drawings, parts that are not related to clearly describing the present disclosure are omitted.

In general, an encoding apparatus transmits encoding information to a decoding apparatus by using a syntax element. For example, the encoding apparatus transmits a flag indicating a prediction mode of a coding unit in a bitstream to the decoding apparatus to inform the decoding apparatus of whether the coding unit has been encoded using intra-prediction or inter-prediction.

In contrast, the decoding apparatus may decode the encoding information according to a data hiding method by using already known data. The decoding apparatus may decode the encoding information according to the data hiding method without parsing the syntax element.

In the present specification, a method of hiding data using parity of effective transform coefficients is provided. The effective transform coefficients may be non-zero transform coefficients. With the data hiding method set forth herein, a bitrate may be decreased to improve encoding and decoding efficiencies.

FIG. 1 is a block diagram of an image decoding apparatus according to an embodiment.

An image decoding apparatus 100 may include a bitstream obtainer 110 and a decoder 120. The image decoding apparatus 100 may include a central processor which generally controls the bitstream obtainer 110 and the decoder 120. Alternatively, the bitstream obtainer 110 and the decoder 120 may correspond to one processor or a plurality of processors operated in connection with each other. Alternatively, the bitstream obtainer 110 and the decoder 120 of the image decoding apparatus 100 may be controlled by an external processor of the image decoding apparatus 100.

The decoder 120 may partition an image into at least one coding unit. A coding unit determined based on block shape information will be described in detail with reference to FIGS. 10 to 23 below.

The decoder 120 may partition a current coding unit into at least one transform unit. When a size of a transform unit is larger than a threshold value, the transform unit may include at least one sub-block. For example, when a threshold value corresponding to the size of the transform unit is 4×4, an 8×8 transform unit may include a total of four 4×4 sub-blocks. When the size of the transform unit is greater than the threshold value, it may be efficient to encode and decode the transform unit by partitioning the transform unit into smaller units. For example, the decoder 120 may decode only sub-blocks including effective transform coefficients by using not only a syntax element (a coded block flag) indicating whether the transform unit includes at least one effective transform coefficient but also a syntax element (a sub coded block flag) indicating whether each sub-block included in the transform unit includes at least one effective transform coefficient. Thus, a decoding speed may be increased and a bitrate may be decreased by skipping decoding sub-blocks including no effective transform coefficients. The syntax element indicating whether the transform unit includes at least one effective transform coefficient and the syntax element indicating whether each sub-block included in the transform unit includes at least one effective transform coefficient may be obtained by the bitstream obtainer 110.

The decoder 120 may decode effective transform coefficients of the transform unit. In detail, the bitstream obtainer 110 may obtain a significance map indicating locations of the effective transform coefficients of the transform unit and information of levels of the effective transform coefficient indicating absolute values and signs of the effective transform coefficients, and the decoder 120 may decode the effective transform coefficients of the transform unit by using the significance map and the information of the levels of the effective transform coefficients. As described above, when the size of the transform unit is greater than the threshold value, the decoder 120 may sequentially decode sub-blocks partitioned from the transform unit in a certain scan order.

When the effective transform coefficients included in the transform unit satisfy a data hiding condition, the decoder 120 may decode hidden encoding information of the coding unit by using parity of the effective transform coefficients of the transform unit. Thus, the decoder 120 may reconstruct samples of the coding unit by using the encoding information of the coding unit which is hidden in the effective transform coefficients of the transform unit without parsing a syntax element indicating the encoding information of the coding unit. For example, the decoder 120 may determine an intra-prediction direction of a current coding unit by using parity of the effective transform coefficients.

When the effective transform coefficients of the transform unit satisfy the data hiding condition, the decoder 120 may determine hidden encoding information of the transform unit by using the parity of the effective transform coefficients of the transform unit. Thus, the decoder 120 may inversely transform the transform unit by using the encoding information of the transform unit which is hidden in the effective transform coefficients of the transform unit without parsing a syntax element indicating the encoding information of the transform unit. For example, the decoder 120 may determine a transformation type of a current transform unit by using the parity of the effective transform coefficients.

When the effective transform coefficients of the transform unit do not satisfy the data hiding condition, the bitstream obtainer 110 may obtain, from a bitstream, at least one of a syntax element corresponding to the hidden encoding information of the coding unit and a syntax element corresponding to the hidden encoding information of the transform unit.

Figure 2:
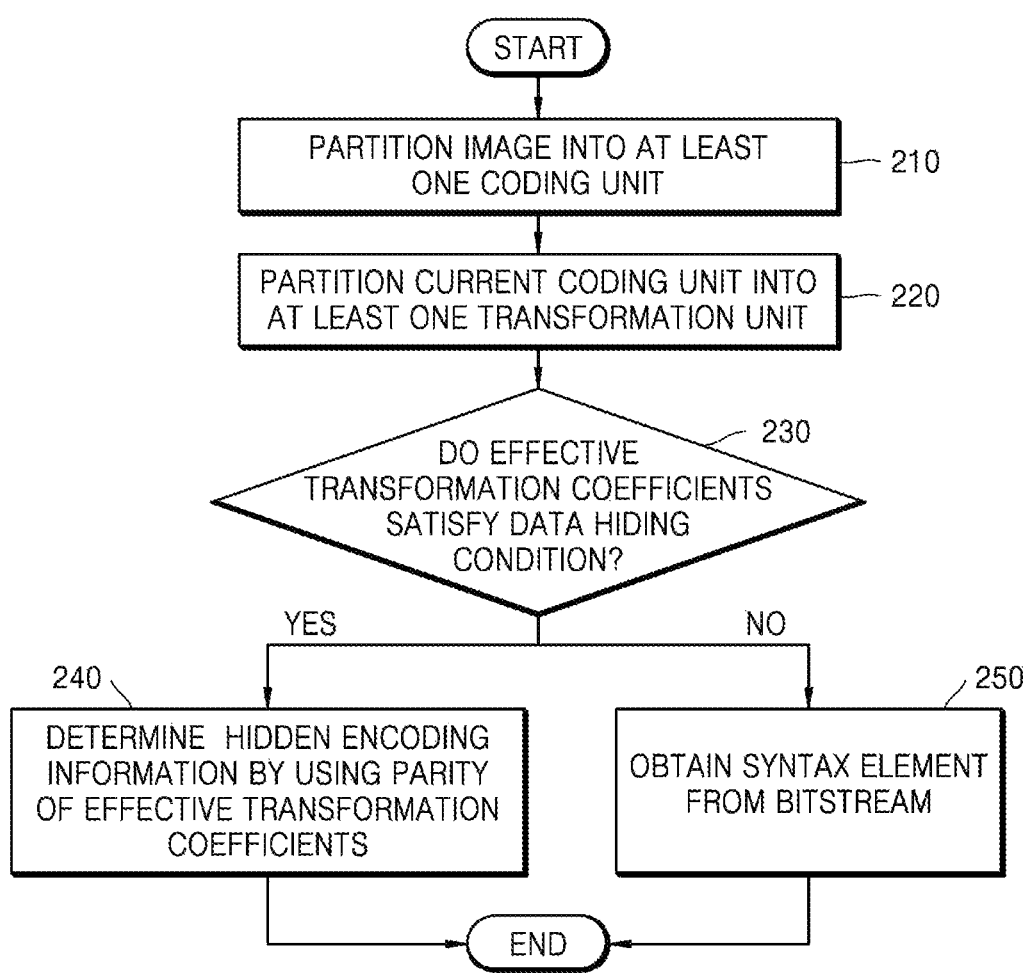
FIG. 2 is a flowchart of a method of decoding an image, performed by an image decoding apparatus, according to an embodiment.

FIG. 2 is a flowchart of a method of decoding an image, performed by an image decoding apparatus, according to an embodiment.

In operation 210, the decoder 120 of the image decoding apparatus 100 may partition an image into at least one coding unit.

In operation 220, the decoder 120 of the image decoding apparatus 100 may partition a current coding unit into at least one transform unit. When a size of a transform unit is greater than a threshold value, the transform unit may include at least one sub-block.

In operation 230, the decoder 120 of the image decoding apparatus 100 may decode effective transform coefficients in the transform unit and determine whether the effective transform coefficients satisfy the data hiding condition.

For example, when the difference between scan positions of an initial effective transform coefficient and a final effective transform coefficient included in the transform unit is greater than a threshold value, encoding information may be hidden in the effective transform coefficients. The scan position of the effective transform coefficient may be understood as one-dimensional (1D) coordinates of the effective transform coefficient when the effective transform coefficients included in the transform unit are one-dimensionally arranged in a scan order and a scan direction. For example, the scan order may include a diagonal scan order, a horizontal scan order, or a vertical scan order, and the scan direction may include a forward direction or a backward direction.

To hide the encoding information in the effective transform coefficients, a level of at least one effective transform coefficient may be corrected during an encoding process. As more effective transform coefficients included in the transform unit are concentrated at similar frequency bands, the meaning of each of the effective transform coefficients may become more important. Thus, when the difference between the scan positions of the initial effective transform coefficient and the final effective transform coefficient included in the transform unit is equal to or less than the threshold value, an influence caused when image quality decreases due to correction or distortion of levels of the effective transform coefficients may be greater than that caused when compression efficiency is improved by reducing a bitrate using data hiding. Accordingly, the image decoding apparatus 100 may not use data hiding when the difference between the scan positions of the initial effective transform coefficient and the final effective transform coefficient included in the transform unit is equal to or less than the threshold value. The threshold value for the difference between the scan positions of the initial effective transform coefficient and the final effective transformation may be increased when a size of a sub-block is large and may be decreased when the size of the sub-block is small.

As another example, when the number of effective transform coefficients included in the transform unit is greater than a threshold value, encoding information may be hidden in the effective transform coefficients. As described above, a level of at least one effective transform coefficient may be corrected during the encoding process to hide the encoding information in the effective transform coefficients. As the number of effective transform coefficients included in the transform unit is decreased, the meaning of each of the effective transform coefficients may become more important. Thus, if the number of effective transform coefficients included in the transformation block is equal to or less than the threshold value, an influence caused when image quality decreases due to correction or distortion of levels of the effective transform coefficients may be greater than that caused when compression efficiency is improved by reducing a bitrate using data hiding. Thus, when the number of effective transform coefficients included in the transform unit is equal to or less than the threshold value, the image decoding apparatus 100 may not use data hiding. The threshold value for the number of effective transform coefficients included in the transform unit may be increased when the size of the sub-block is large and may be decreased when the size of the sub-block is small.

As another example, the encoding information may be hidden in the effective transform coefficients when the difference between the scan positions of the initial effective transform coefficient and the final effective transform coefficient included in the transform unit is greater than a first threshold value and the number of effective transform coefficients included in the transformation block is greater than a second threshold value.

The data hiding condition may be set for effective transform coefficients included in a sub-block of the transformation block. For example, the encoding information may be hidden in the effective transform coefficients when the difference between scan positions of a final effective transform coefficient and an initial effective transform coefficient in a 4×4 sub-block included in the transformation block is greater than a threshold value (e.g., 3 or 4). As another example, when the number of effective transform coefficients in the 4×4 sub-block of the transformation block is greater than a threshold value (e.g., an integer from 1 to 16), the encoding information may be hidden in the effective transform coefficients. As another example, the encoding information may be hidden in the effective transform coefficients when the difference between the scan positions of a final effective transform coefficient and an initial effective transform coefficient in a sub-block included in the transform unit is greater than the first threshold value and the number of effective transform coefficients included in the sub-block of the transformation block is greater than the second threshold value.

In operation 240, when it is determined in operation 230 that the effective transform coefficients satisfy the data hiding condition, the decoder 120 of the image decoding apparatus 100 may determine at least one of encoding information of the coding unit and encoding information of the transform unit by using parity of the effective transform coefficients.

A syntax element corresponding to a 1-bit flag or a 1-bit index or more determined for each of coding units partitioned from the image may be a target of data hiding. In a syntax structure, when the image is partitioned into a coding unit, syntax elements parsed by the image decoding apparatus 100 may be a target of data hiding. For example, syntax elements to be parsed may be hidden encoding information of a coding unit according to the syntax structure (Chapter 7.3.8.5, *Coding unit syntax*, Recommendation ITU-T H.265).

Since the image decoding apparatus 100 may decode data hidden in an effective transform coefficient after the effective transform coefficient is reconstructed, a syntax element used to reconstruct the effective transform coefficient among the syntax elements of the coding unit may not be appropriate as a target of data hiding. For example, a flag indicating whether at least one effective transform coefficient is included in the coding unit ("rqt_root_cbf" in H.265) may not be appropriate as a target of data hiding.

Furthermore, a syntax element, the value of which should be determined to determine whether another syntax element is to be parsed may not be appropriate as a target of data hiding. A syntax element regarding an effective transform coefficient, such as a significance map and information of levels of the effective transform coefficients, is located at the end of the syntax structure and thus the image decoding apparatus 100 may decode the encoding information of the coding unit which is hidden in the effective transform coefficient after a parsing process is completed. Accordingly, when the syntax element, the value of which should be determined to determine whether another syntax element is to be parsed is not included in a bitstream but is hidden in the effective transform coefficients, the parsing process performed by the image decoding apparatus 100 may be stopped. For example, whether a syntax element ("pred_mode" in H.265) indicating a size of a prediction unit according to a value of a prediction mode flag ("pred_mode_flag" in H.265) indicating whether a current coding unit has been encoded using intra-prediction or inter-prediction is to be parsed is determined and thus the prediction mode flag of the coding unit may not be appropriate as a target of data hiding.

Accordingly, a syntax element having no influence on reconstruction of samples of the coding unit, even when parsed after the effective transform coefficient is decoded, among the syntax elements of the coding unit may be a target of data hiding. Furthermore, the syntax element of the coding unit which is the target of data hiding may be independent from a process of parsing another syntax element. For example, when a current coding unit is encoded using intra-prediction, a flag or an index indicating an intra-prediction direction may be a target of data hiding, and a syntax element indicating the intra-prediction direction may not be included in the bitstream. As another example, a flag or an index indicating whether values of samples of neighboring coding units are to be filtered to reconstruct values of samples of the current coding unit may be a target of data hiding. A syntax element indicating whether the values of the samples of the neighboring coding units are to be filtered may not be included in the bitstream.

A method of decoding a hidden intra-prediction direction using parity of effective transform coefficients, performed by the image decoding apparatus 100, will be described with reference to FIG. 3 below.

A syntax element corresponding to a 1-bit flag or a 1-bit index or more determined for each of transform units partitioned from a coding unit among syntax elements may be a target of data hiding. In a syntax structure, a syntax element parsed by the image decoding apparatus 100 when an image is partitioned into a transform unit may be a target of data hiding. For example, a syntax element to be parsed in a syntax structure may be hidden encoding information of a transform unit (Chapter 7.3.8.10, *Transform unit syntax*, Recommendation ITU-T H.265).

Since the image decoding apparatus 100 may decode data hidden in an effective transform coefficient after the effective transform coefficient is reconstructed, a syntax element used to reconstruct the effective transform coefficient among the syntax elements of the transform unit may not be appropriate as a target of data hiding. Furthermore, a syntax element, the value of which should be determined to determine whether another syntax element is to be parsed, may not be appropriate as a target of data hiding.

Accordingly, a syntax element having no influence on reconstruction of samples of the transform unit, even when parsed after the effective transform coefficient is decoded, among the syntax elements of the transform unit may be a target of data hiding. The syntax element of the transform unit which is the target of data hiding may be independent from a process of parsing another syntax element. For example, a flag or an index indicating whether a current transform unit has been transformed through discrete cosine transform (DCT), discrete sine transform (DST), or discrete multi-tone modulation (DMT) may be a target of data hiding. A syntax element indicating a type of the transformation of the current transform unit may not be included in a bitstream.

A method of decoding hidden data regarding a transformation type by using parity of effective transform coefficients, the method being performed by the image decoding apparatus 100, will be described with reference to FIG. 4 below.

A method of decoding hidden data regarding an intra-prediction direction and a transformation type by using parity of effective transform coefficients, the method being performed by the image decoding apparatus 100, will be described with reference to FIG. 5 below.

In operation 250, when it is determined in operation 240 that the effective transform coefficients do not satisfy the data hiding condition, the bitstream obtainer 110 may obtain, from the bitstream, at least one of a syntax element corresponding to the encoding information of the coding unit and a syntax element corresponding to the encoding information of the transform unit.

Figure 3:
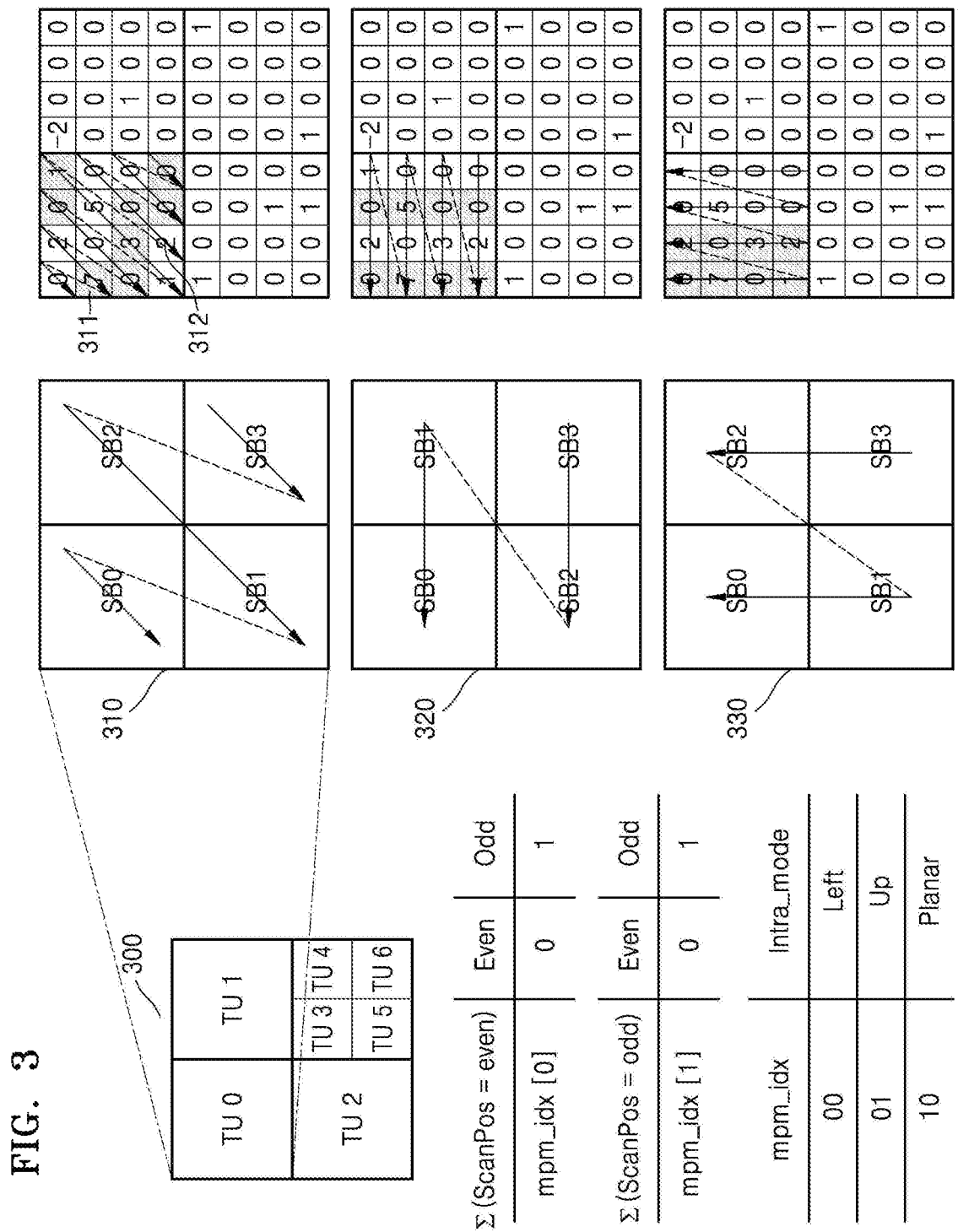
FIG. 3 is a diagram illustrating determining encoding information of a coding unit by using parity of effective transform coefficients, the determination being performed by an image decoding apparatus, according to an embodiment.

FIG. 3 is a diagram illustrating decoding data regarding an intra-prediction direction hidden in effective transform coefficients, the decoding being performed by an image decoding apparatus, according to an embodiment.

The intra-prediction direction may be determined for each coding unit. A coding unit determined based on block shape information will be described in detail with reference to FIGS. 10 to 23 below.

Alternatively, the intra-prediction direction may be determined for each of prediction units partitioned from a coding unit. In detail, the bitstream obtainer 110 may obtain data regarding a partition mode indicating a partition type of the prediction units from a bitstream. The image decoding apparatus 100 may partition a current coding unit into at least one prediction unit, based on the partition mode. For example, when the partition mode indicates that a size of a prediction mode for a coding unit of an intra-prediction mode is 2N×2N, a prediction unit having the same size as the current coding unit may be determined, based on the current coding unit. In this case, an intra-prediction direction of the prediction unit having the same size as the current coding unit may be hidden in an effective transform coefficient of a transform unit partitioned from the current coding unit. When the partition mode indicates that the size of the prediction unit is N×N, four square type prediction units may be partitioned from the current coding unit. In this case, data regarding an intra-prediction direction of one of the prediction units partitioned from the current coding unit may be hidden in an effective transform coefficient of the transform unit partitioned from the current coding unit.

The image decoding apparatus 100 may determine a candidate transform unit which may include the effective transform coefficient in which the data regarding the intra-prediction direction is hidden from among at least one transform unit partitioned from the current coding unit. The image decoding apparatus 100 may determine, as a candidate transform unit, a transform unit to be first inversely transformed or a transform unit to be lastly inversely transformed among transform units of the current coding unit which include at least one effective transform coefficient. For example, when transform units TU0 of TU6 of a current coding unit 300 are decoded in a raster scan order, the transform unit TU0 of the current coding unit 300 to be first decoded in the raster scan order may be a candidate transform unit. Alternatively, the transform unit TU6 of the current coding unit 300 to be lastly decoded in the raster scan order may be a candidate transform unit.

The image decoding apparatus 100 may determine a candidate sub-block which may include an effective transform coefficient in which data regarding an intra-prediction direction is hidden from among at least one sub-block included in a transform unit. The image decoding apparatus 100 may determine, as candidate sub-blocks, a sub-block to be first scanned, a sub-block to be second scanned, or a sub-block to be lastly scanned from among sub-blocks of the transform unit which include at least one effective transform coefficient. For example, the image decoding apparatus 100 may scan the sub-blocks of the transform unit in a backward direction in an up-right diagonal scan order indicated by reference numeral 310, a horizontal scan order indicated by reference numeral 320, or a vertical scan order indicated by reference numeral 330. The scanning of the sub-blocks in the backward direction by the image decoding apparatus 100 may be understood to mean that the image decoding apparatus 100 scans the sub-blocks from a sub-block at a highest scan position to a sub-block at a lowest scan position in a certain scan order. Thus, the image decoding apparatus 100 may determine, as candidate sub-block, a sub-block SB3 having a size of 4×4 to be first scanned in the scan order among sub-blocks of the transformation block TU0 having a size of 8×8. Alternatively, the image decoding apparatus 100 may determine a sub-block SB0 to be lastly scanned as a candidate sub-block. In contrast, scanning of the sub-blocks in a forward direction by the image decoding apparatus 100 may be understood to mean that the image decoding apparatus 100 scans the sub-blocks from the sub-block at the lowest scan position to the sub-block at the highest scan position in the scan order.

Generally, since effective transform coefficients of the transform unit are concentrated at low frequency bands, a sub-block of the transform unit corresponding to a direct-current (DC) frequency band and located at an upper left side of the transform unit may include a largest number of effective transform coefficients. Thus, the sub-block to be lastly scanned among the sub-blocks of the transform unit may be used as a candidate sub-block when the image decoding apparatus 100 scans the sub-blocks in the backward direction, and the sub-block to be first scanned among the sub-blocks of the transform unit may be used as a candidate sub-block when the image decoding apparatus 100 scans the sub-blocks in the forward direction.

A case in which the transform unit TU0 of the current coding unit 300 to be first inversely transformed in the raster scan order is a candidate transform unit and the sub-block SB0 of the transform unit TU0 to be scanned in the backward direction is a candidate sub-block will be described below.

As described above with respect to operation 230, the image decoding apparatus 100 may determine whether effective transform coefficients included in a candidate sub-block of a candidate transform unit satisfy the data hiding condition. For example, the data hiding condition may be satisfied when the number of effective transform coefficients included in the candidate sub-block is greater than a first threshold value of 3 and the difference between scan positions of a final effective transform coefficient and an initial effective transform coefficient of the candidate sub-block is greater than a second threshold value of 4. The second threshold value may be greater than the first threshold value.

When the sub-blocks of the transform unit TU0 are scanned in the backward direction in the up-right diagonal scan order as indicated by reference numeral 310, transform coefficients included in the sub-block SB0, which is the candidate sub-block, may be also scanned in the backward direction in the up-right diagonal scan order. Thus, the difference between a scan position 15 of a final effective transform coefficient 311 of a level 7 and a scan position 5 of an initial effective transform coefficient 312 of a level 2, which are included in the sub-block SB0, is 10 and is thus greater than a first threshold value of 4, and the number of effective transform coefficients included in the sub-block SB0 is 7 and is thus greater than a second threshold value of 3. Accordingly, the sub-block SB0 satisfies the data hiding condition.

When the sub-block SB0 satisfies the data hiding condition, the image decoding apparatus 100 may determine an intra-prediction direction of the current coding unit 300 by using parity of the sum of effective transform coefficients included in the sub-block SB0 and corresponding to certain scan positions.

In detail, the image decoding apparatus 100 may determine part of a syntax element indicating an intra-prediction direction by using parity of the sum of effective transform coefficients of the sub-block SB0 corresponding to even-numbered scan positions, and determine a remaining part of the syntax element indicating the intra-prediction direction by using parity of the sum of effective transform coefficients of the sub-block SB0 corresponding to odd-numbered scan positions. For example, when a scan order of the transform coefficients included in the sub-block SB0 is a diagonal direction as indicated by reference numeral 310, the image decoding apparatus 100 may determine a least significant bit (LSB) which is a first bit of a most probable mode (mpm) index by using the parity of the sum of the effective transform coefficients corresponding to the even-ordered scan positions among the effective transform coefficients included in the sub-block SB0, and determine a most significant bit (MSB) which is a second bit of the mpm index by using the parity of the sum of effective transform coefficients corresponding to the odd-ordered scan positions. In detail, the sub-block SB0 having a size of 4×4 may include a total of sixteen transform coefficients from a scan position 0 to a scan position 15. Thus, the first bit of the mpm index may be 1 since the sum of effective transform coefficients {1, 3, 7} corresponding to scan positions {6, 8, 14} is 11, i.e., an odd number, and the second bit thereof may be 0 since the sum of effective transform coefficients {2, 5, 1, 2} corresponding to scan positions {5, 7, 9, 13} is 10, i.e., an even number. Furthermore, the image decoding apparatus 100 may determine an intra-prediction direction of a current coding unit to be an intra-prediction direction of a neighboring coding unit, based on the mpm index. For example, the intra-prediction direction of the current coding unit may be an intra-prediction direction of a left coding unit when the mpm index is 0 and may be an intra-prediction direction of an upper coding unit when the mpm index is 1, and an intra-prediction mode of the current coding unit may be a planar mode when the mpm index is 2. In the above example, the mpm index is a binary number '01' and thus the intra-prediction mode of the current coding unit may be an intra-prediction direction of an upper coding unit.

A scan position of effective transform coefficients in which an intra-prediction mode is hidden may be determined according to a scan order of transform coefficients included in a candidate sub-block. When the scan order of the transform coefficients included in the sub-block SB0 is a horizontal direction as indicated by reference numeral 320 unlike that indicated by reference numeral 310, the image decoding apparatus 100 may determine the first bit of the mpm index by using parity of the sum of the effective transform coefficients corresponding to the odd-numbered scan positions among the effective transform coefficients included in the sub-block SB0, and determine the second bit of the mpm index by using parity of the sum of the effective transform coefficients corresponding to the even-numbered scan positions. Thus, the first bit of the mpm index may be 1 since the sum of effective transform coefficients {1, 5, 7} corresponding to scan positions {3, 9, 11} is 13, i.e., an odd number, and the second bit thereof may be 0 since the sum of effective transform coefficients {2, 3, 1, 2} corresponding to scan positions {2, 6, 12, 14} is 8, i.e., an even number. Accordingly, the mpm index is a binary value '01' and thus the intra-prediction mode of the current coding unit may be an intra-prediction direction of an upper coding unit.

When a candidate sub-block satisfies the data hiding condition, the image decoding apparatus 100 may determine part of a syntax element indicating an intra-prediction direction by using parity of the sum of effective transform coefficients of the candidate sub-block corresponding to a certain scan position and obtain a remaining part of the syntax element from the bitstream. For example, when the scan order of the transform coefficients included in the sub-block SB0 is a vertical direction as indicated by reference numeral 330, the image decoding apparatus 100 may determine the first bit of the mpm index by using parity of the sum of effective transform coefficients corresponding to scan positions of 8 to 15 among the effective transform coefficients included in the sub-block SB0 having the size of 4×4, and obtain the second bit of the mpm index from the bitstream. Accordingly, the sum of effective transform coefficients {2, 3, 2, 1, 7} corresponding to scan positions {8, 9, 11, 12, 14} is 15, i.e., an odd number, and thus the first bit of the mpm index may be 1. The second bit of the mpm index obtained from the bitstream may be 0. Since the mpm index is a binary value '01', the intra-prediction mode of the current coding unit may be an intra-prediction mode of an upper coding unit.

When the candidate sub-block does not satisfy the data hiding condition, the image decoding apparatus 100 may parse the mpm index from the bitstream. For example, the image decoding apparatus 100 may determine an intra-prediction direction of a current coding unit to be an intra-prediction direction of a neighboring coding unit, based on the mpm index parsed from the bitstream, when the difference between the scan positions of the final effective transform coefficient 311 and the initial effective transform coefficient 312 included in the sub-block SB0 is equal to or less than a first threshold value or when the number of effective transform coefficients included in the sub-block SB0 is equal to or less than a second threshold value.

FIG. 3 illustrates an intra-prediction direction as an example of hidden encoding information of the current coding unit 300. However, as described above with reference to FIG. 2, the hidden encoding information of the current coding unit 300 may be a syntax element corresponding to a 1-bit flag or a 1-bit index or more determined for each of coding units partitioned from an image, as well as the intra-prediction direction.

Figure 4:
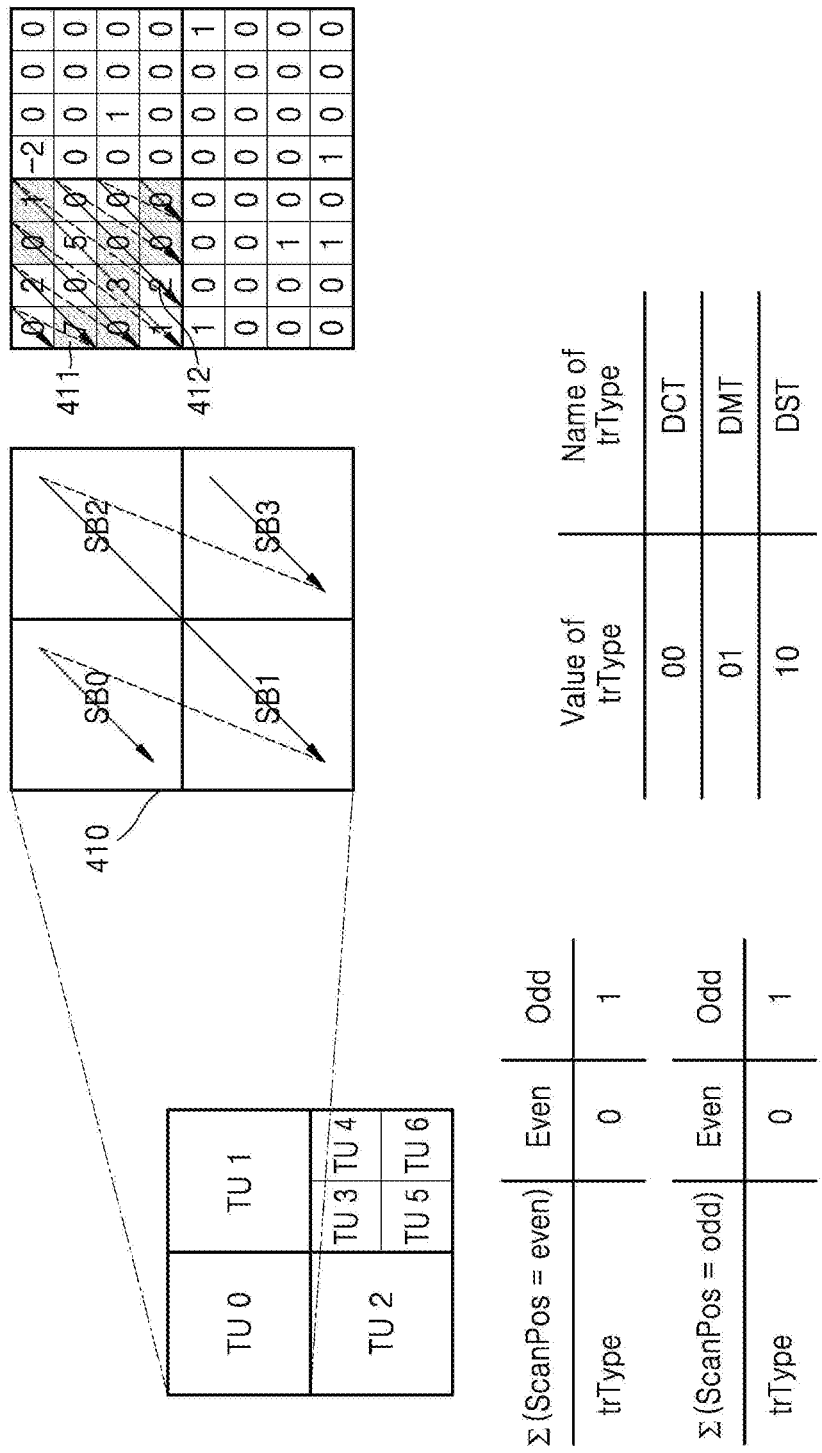
FIG. 4 is a diagram illustrating determining encoding information of a transform unit by using parity of effective transform coefficients, the determination being performed by an image decoding apparatus, according to an embodiment.

FIG. 4 is a diagram illustrating determining encoding information of a transform unit by using parity of effective transform coefficients, the determination being performed by an image decoding apparatus, according to an embodiment.

The image decoding apparatus 100 may determine a candidate sub-block which may include an effective transform coefficient in which data regarding a transformation type of a current transform unit is hidden among at least one sub-block included in a current transform unit. The image decoding apparatus 100 may determine, as a candidate sub-block, a sub-block to be first scanned, a sub-block to be second scanned, or a sub-block to be lastly scanned among sub-blocks of the current transform unit which include at least one effective transform coefficient. For example, the image decoding apparatus 100 may determine a sub-block SB0 to be lastly scanned as a candidate sub-block when the image decoding apparatus 100 scans sub-blocks included in a transform unit in a backward direction in an up-right diagonal scan order as indicated by reference numeral 410.

A case in which a candidate sub-block of a transform unit TU0 is the sub-block SB0 to be lastly scanned in the transform unit TU0 when scanning is performed in the backward direction will be described below.

When sub-blocks included in the transform unit TU0 are scanned in the backward direction in the up-right diagonal scan order as indicated by reference numeral 410, transform coefficients included in the sub-block SB0, which is the candidate sub-block, may be also scanned in the backward direction in the up-right diagonal scan order. Thus, the difference between a scan position 15 of a final effective transform coefficient 411 of a level 7 and a scan position 5 of an initial effective transform coefficient 412 of a level 2, which are included in the sub-block SB0, is 10 and is thus greater than a first threshold value of 4 and a total number of effective transform coefficients included in the sub-block SB0 is 7 and is thus greater than a second threshold value of 3. Accordingly, the sub-block SB0 satisfies the data hiding condition.

When the sub-block SB0 satisfies the data hiding condition, the image decoding apparatus 100 may determine a transformation type of the transform unit TU0 by using parity of the sum of effective transform coefficients of the sub-block SB0 corresponding to certain scan positions.

In detail, the image decoding apparatus 100 may determine part of a syntax element indicating the transformation type of the transform unit TU0 by using parity of the sum of effective transform coefficients of the sub-block SB0 corresponding to even-numbered scan positions, and determine a remaining part of the syntax element indicating an intra-prediction direction by using parity of the sum of effective transform coefficients of the sub-block SB0 corresponding to odd-numbered scan positions. For example, when a scan order of the transform coefficients included in the sub-block SB0 is a diagonal direction as indicated by reference numeral 410, the image decoding apparatus 100 may determine a first bit of a trType (transform type) index by using parity of the sum of the effective transform coefficients corresponding to the even-numbered scan positions among the effective transform coefficients included in the sub-block SB0, and determine a second bit of the trType index by using parity of the sum of the effective transform coefficients corresponding to the odd-numbered scan positions. In detail, the sub-block SB0 having a size of 4×4 may include a total of sixteen transform coefficients corresponding to scan positions 0 to 15. Accordingly, since the sum of effective transform coefficients {1, 3, 7} corresponding to scan positions {6, 8, 14} is 11, i.e., an odd number, the first bit of the trType index is 1, and thus the transformation type of the transform unit TU0 may be determined to be DMT without determining the second bit of the trType index.

When the sum of the effective transform coefficients corresponding to the even-numbered scan positions among the effective transform coefficients included in the sub-block SB0 is an even number, the first bit of the trType index may be 0 and the transformation type of the transform unit TU0 may be DCT or DST. In this case, the image decoding apparatus 100 may obtain the sum of the effective transform coefficients corresponding to the odd-numbered scan positions among the effective transform coefficients included in the sub-block SB0. When the sum of the effective transform coefficients corresponding to the odd-numbered scan positions among the effective transform coefficients included in the sub-block SB0 is an even number, the second bit of the trType index may be 0 and the trType index is a binary number '00'. Thus, the image decoding apparatus 100 may determine the transformation type of the transform unit TU0 to be DCT. When the sum of the effective transform coefficients corresponding to the odd-numbered scan positions among the effective transform coefficients included in the sub-block SB0 is an odd number, the second bit of the trType index may be 1 and the trType index may be a binary number '10'. Thus, the image decoding apparatus 100 may determine the transformation type of the transform unit TU0 to be DST.

A scan position of an effective transform coefficient in which data of a transformation type of a current transform unit is hidden may be determined according to a scan order of transform coefficients included in the candidate sub-block. When the scan order of the transform coefficients included in the sub-block SB0 is a horizontal direction unlike that indicated by reference numeral 410, the image decoding apparatus 100 may determine the first bit of the trType index by using parity of the sum of the effective transform coefficients corresponding to the odd-numbered scan positions among the effective transform coefficients included in the sub-block SB0, and determine the second bit of the trType index by using parity of the sum of the effective transform coefficients corresponding to the even-numbered scan positions.

When a candidate sub-block satisfies the data hiding condition, the image decoding apparatus 100 may determine part of a syntax element by using parity of the sum of effective transform coefficients of the candidate sub-block corresponding to certain scan positions and obtain a remaining part of the syntax element from a bitstream.

When the candidate sub-block does not satisfy the data hiding condition, the image decoding apparatus 100 may parse the trType index from the bitstream. For example, the image decoding apparatus 100 may determine a transformation type of a current transform unit, based on the trType index parsed from the bitstream, when the difference between scan positions of the final effective transform coefficient 411 and the initial effective transform coefficient 412 which are included in the sub-block SB0 is equal to or less than a first threshold value or when the number of effective transform coefficients included in the sub-block SB0 is equal to or less than a second threshold value.

FIG. 4 illustrates a transformation type as an example of the hidden encoding information of a current transform unit 410. However, as described above with reference to FIG. 2, the hidden encoding information of the current transform unit 410 may be a syntax element corresponding to a 1-bit flag or a 1-bit index or more determined for each of transform units partitioned from a current coding unit, as well as the transformation type.

Figure 5:
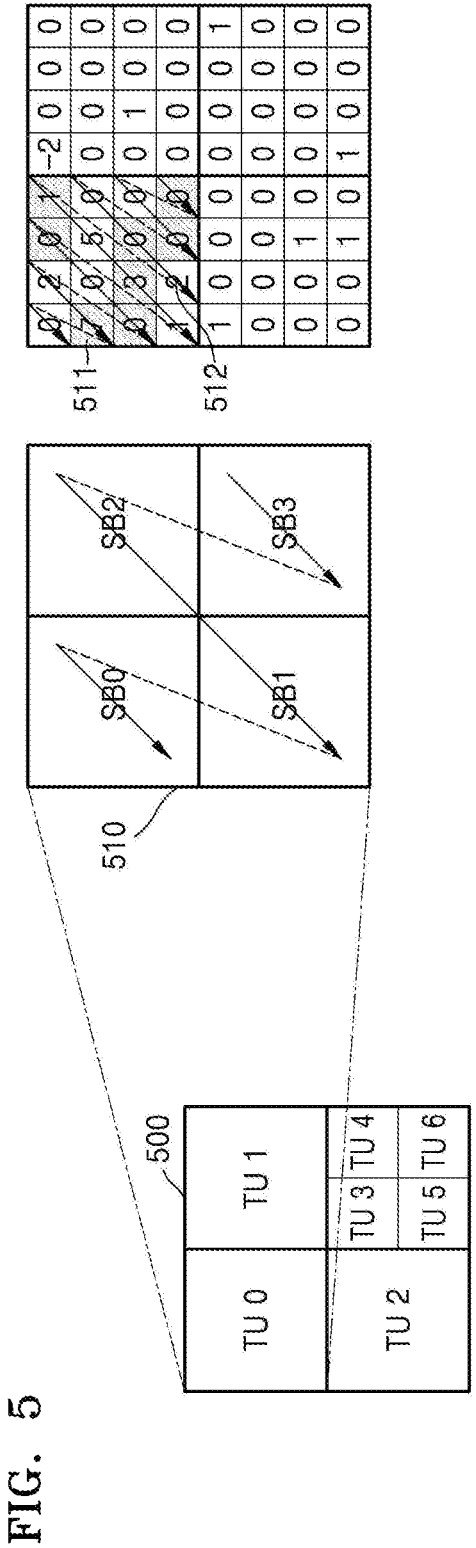
FIG. 5 is a diagram illustrating determining encoding information of a coding unit, encoding information of a transform unit, and a sign of an initial effective transform coefficient by using parity of effective transform coefficients, the determination being performed by an image decoding apparatus, according to an embodiment.

FIG. 5 is a diagram illustrating determining encoding information of a coding unit, encoding information of a transform unit, and a sign of an initial effective transform coefficient by using parity of effective transform coefficients, the determination being performed by an image decoding apparatus, according to an embodiment.

When a sub-block SB0 satisfies the data hiding condition, the image decoding apparatus 100 may determine at least one among an intra-prediction direction of a current coding unit 500, a transformation type of a transform unit TU0, and a sign of an initial effective transform coefficient included in the sub-block SB0 by using parity of the sum of effective transform coefficients in the sub-block SB0.

When sub-blocks of the transform unit TU0 are scanned in a backward direction in an up-right diagonal scan order as indicated by reference numeral 510, transform coefficients included in the sub-block SB0, which is a candidate sub-block, may be also scanned in the backward direction in the up-right diagonal scan order. Thus, the difference between a scan position 15 of a final effective transform coefficient 511 of a level 7 and a scan position 5 of an initial effective transform coefficient 512 of a level which are included in the sub-block SB0 is 10 and is thus greater than a first threshold value of 4, and a total number of effective transform coefficients included in the sub-block SB0 is 7 and is thus greater than a second threshold value of 3. Accordingly, the sub-block SB0 satisfies the data hiding condition.

Since the sub-block SB0 satisfies the data hiding condition, the image decoding apparatus 100 may determine part of a syntax element indicating the intra-prediction direction of the current coding unit 500 and part of a syntax element indicating the transformation type of the transform unit TU0 by using parity of the sum of effective transform coefficients of the sub-block SB0 corresponding to even-numbered scan positions. Alternatively, the image decoding apparatus 100 may determine a remaining part of the syntax element indicating the intra-prediction direction, a remaining part of the syntax element indicating the transformation type of the transform unit TU0, and a sign of the initial effective transform coefficient 511 of the sub-block SB0 by using parity of the sum of effective transform coefficients of the sub-block SB0 corresponding to odd-numbered scan positions. For example, when a scan order of the transform coefficients of the sub-block SB0 is a diagonal direction as indicated by reference numeral 510, the image decoding apparatus 100 may determine a first bit of an mpm index and a first bit of a trType index by using the parity of the sum of the effective transform coefficients of the sub-block SB0 corresponding to the even-numbered scan positions, and determine a second bit of the mpm index, a second bit of the trType index, and the sign of the initial effective transform coefficient 511 by using the parity of the sum of the effective transform coefficients of the sub-block SB0 corresponding to the odd-numbered scan positions. In detail, the sub-block SB0 having a size of 4×4 may include a total of sixteen transform coefficients from a scan position 0 to a scan position 15. Accordingly, the sum of effective transform coefficients {1, 3, 7} corresponding to scan positions {6, 8, 14} is 11, i.e., an odd number, and the sum of effective transform coefficients {2, 5, 1, 2} corresponding to scan positions {5, 7, 9, 13} is 10, i.e., an even number. Accordingly, the mpm index is a binary number '01' and thus the intra-prediction direction of the current coding unit 500 may be an intra-prediction direction of an upper coding unit. The trType index is a binary number '01' and thus the transformation type of the transform unit TU0 may be DMT. Accordingly, the initial effective transform coefficient 511 of the sub-block SB0 may be a positive number.

When the sign of the initial effective transform coefficient 511 of the sub-block SB0 is determined using parity of the sum of effective transform coefficients of the sub-block SB0 corresponding to certain scan positions, the scan positions may not include a scan position of the initial effective transform coefficient 511 of the sub-block SB0. For example, data may not be hidden in a scan position 14 of the initial effective transform coefficient 511 of the sub-block SB0. Thus, since the sum of effective transform coefficients {1, 3} corresponding to scan positions {6, 8} is 4, i.e., an even number, and the sum of effective transform coefficients {2, 5, 1, 2} corresponding to scan positions {5, 7, 9, 13} is 10, i.e., an even number, the mpm index is a binary number '00'. Accordingly, the intra-prediction direction of the current coding unit 500 may be an intra-prediction direction of a left coding unit, the transformation type of the transform unit TU0 may be DCT, and the initial effective transform coefficient 511 of the sub-block SB0 may be a positive number.

Alternatively, the sign of the initial effective transform coefficient 511 of the sub-block SB0 may be determined using parity of an absolute value of the initial effective transform coefficient 511. For example, the absolute value of the initial effective transform coefficient 511 of the sub-block SB0 is 7, i.e., an odd number, and thus the initial effective transform coefficient 511 may be determined to be a negative number without considering parity of the sum of other effective transform coefficients.

Figure 6:
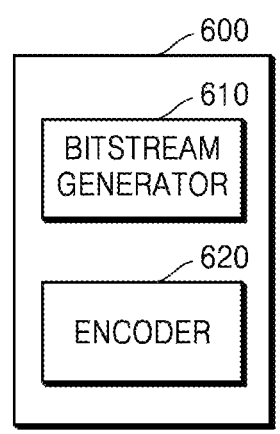
FIG. 6 is a block diagram of an image encoding apparatus according to an embodiment.

FIG. 6 is a block diagram of an image encoding apparatus 600 according to an embodiment. An operation of the image encoding apparatus 600 may be substantially the same as or opposite to various embodiments of the operation of the image decoding apparatus 100 described above with reference to FIGS. 1 to 5.

The image encoding apparatus 600 may include a bitstream generator 610 and an encoder 620. The image encoding apparatus 600 may further include a central processor which controls overall operations of the bitstream generator 610 and the encoder 620. Alternatively, the bitstream generator 610 and the encoder 620 may correspond to one processor or a plurality of processors operated in connection with each other. Alternatively, the bitstream generator 610 and the encoder 620 may be controlled by an external processor of the image encoding apparatus 600.

The encoder 620 may partition an image into at least one coding unit. A coding unit determined based on block shape information will be described in detail with reference to FIGS. 10 to 23 below.

The encoder 620 may partition a current coding unit into at least one transform unit. When a size of a transform unit is greater than a threshold value, the transform unit may include at least one sub-block. For example, when the threshold value corresponding to a size of a transform unit is 4×4, an 8×8 transform unit may include a total of four 4×4 sub-blocks.

The encoder 620 may obtain transform coefficients of the transform unit by transforming and quantizing residual samples of the transform unit. Furthermore, the encoder 620 may encode a significance map of the transform coefficients of the transform unit and information of levels of the transform coefficients. When the size of the transform unit is greater than the threshold value as described above, the encoder 620 may sequentially encode sub-blocks partitioned from the transform unit in a certain scan order.

When effective transform coefficient of the transform unit satisfies the data hiding condition, the encoder 620 may hide encoding information of a coding unit by parity of an effective transform coefficient of the transform unit. Thus, the encoder 620 may not generate a syntax element indicating the encoding information of the coding unit. For example, the encoder 620 may hide data of an intra-prediction direction of a current coding unit in the parity of an effective transform coefficient.

When the effective transform coefficients of the transform unit satisfy the data hiding condition, the encoder 620 may hide encoding information of the transform unit by using the parity of the effective transform coefficient of the transform unit. Thus, the encoder 620 may not generate a syntax element indicating the encoding information of the transform unit. For example, the encoder 620 may hide data of a transformation type of a current transform unit in the parity of the effective transform coefficient.

When the effective transform coefficients of the transform unit do not satisfy the data hiding condition, the bitstream generator 610 may generate, in the form of a bitstream, at least one of a syntax element corresponding to hidden encoding information of a coding unit and a syntax element corresponding to the hidden encoding information of the transform unit.

Figure 7:
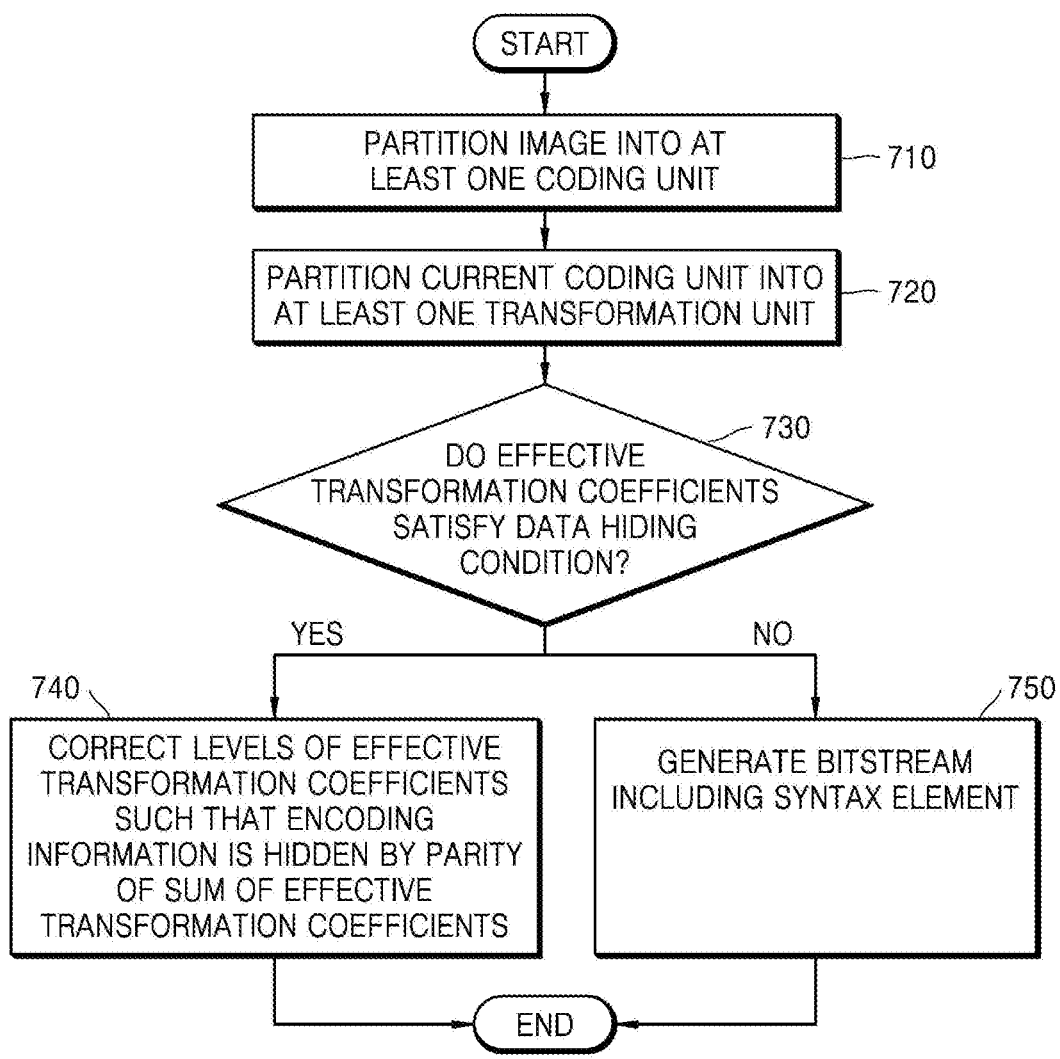
FIG. 7 is a flowchart of a method of encoding an image, performed by an image encoding apparatus, according to an embodiment.

FIG. 7 is a flowchart of a method of encoding an image, performed by an image encoding apparatus, according of an embodiment.

In operation 710, the encoder 620 of the image encoding apparatus 600 may partition an image into at least one coding unit.

In operation 720, the encoder 620 of the image encoding apparatus 600 may partition a current coding unit into at least one transform unit. When a size of a transform unit is greater than a threshold value, the transform unit may include at least one sub-block.

In operation 730, the encoder 620 of the image encoding apparatus 600 may decode effective transform coefficients in the transform unit and determine whether the effective transform coefficients satisfy the data hiding condition.

For example, when the difference between scan positions of an initial effective transform coefficient and a final effective transform coefficient included in the transform unit is greater than the threshold value, encoding information may be hidden in the effective transform coefficients. As another example, when the number of effective transform coefficients in the transform unit is greater than the threshold value, the encoding information may be hidden in the effective transform coefficients. As another example, the encoding information may be hidden in the effective transform coefficients when the difference between the scan positions of the initial effective transform coefficient and the final effective transform coefficient included in the transform unit is greater than a first threshold value and the number of effective transform coefficients included in the transformation block is greater than a second threshold value.

The data hiding condition may be set for effective transform coefficients included in a sub-block of the transformation block. For example, the encoding information may be hidden in the effective transform coefficients when the difference between scan positions of a final effective transform coefficient and an initial effective transform coefficient of a 4×4 sub-block included in the transformation block is greater than a threshold value (e.g., 3 or 4). As another example, the encoding information may be hidden in the effective transform coefficients when the number of effective transform coefficients included in the 4×4 sub-block included in the transformation block is greater than a threshold value (e.g., an integer from 1 to 16). As another example, the encoding information may be hidden in the effective transform coefficients when the difference between scan positions of a final effective transform coefficient and an initial effective transform coefficient of a sub-block included in the transformation block is greater than a first threshold value and the number of effective transform coefficients included in the sub-block of the transformation block is greater than a second threshold value.

In operation 740, when it is determined in operation 730 that the effective transform coefficients satisfy the data hiding condition, the encoder 620 of the image encoding apparatus 600 may correct levels of the effective transform coefficients such that at least one among encoding information of a coding unit, the encoding information of the transform unit, and a sign of the initial effective transform coefficient may be hidden by parity of the effective transform coefficients.

A method of correcting effective transform coefficients, performed by the image encoding apparatus 600, such that data regarding an intra-prediction direction of a current coding unit, a transformation type of the current transform unit, and a sign of an initial effective transform coefficient is hidden by parity of effective transform coefficients will be described with reference to FIG. 8 below.

In operation 750, when it is determined in operation 740 that effective transform coefficients do not satisfy the data hiding condition, the bitstream generator 610 may generate a bitstream including at least one of a syntax element corresponding to the encoding information of the coding unit, a syntax element corresponding to the encoding information of the transform unit, and a syntax element corresponding to the sign of the initial effective transform coefficient.

Figure 8:
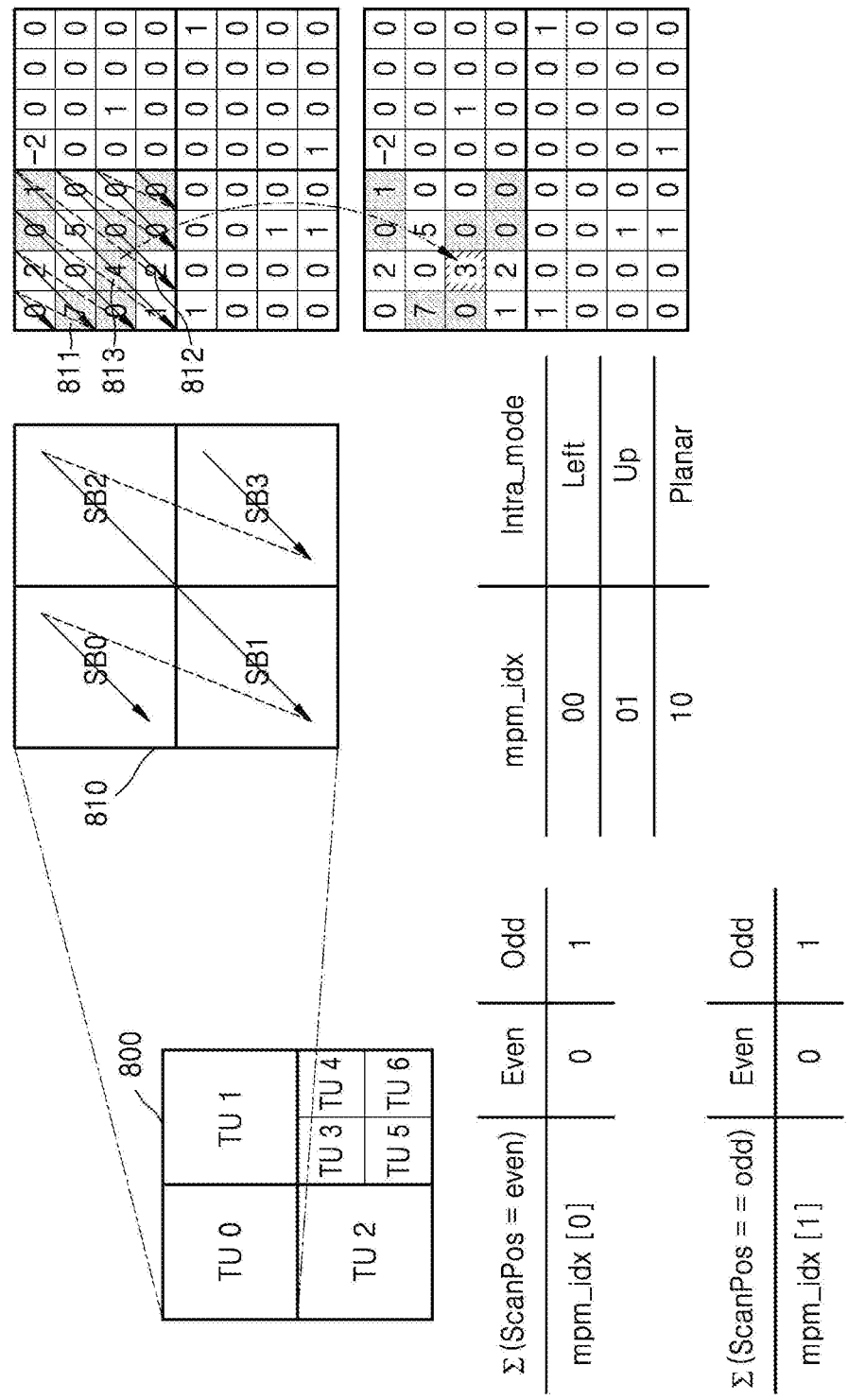
FIG. 8 is a diagram illustrating encoding effective transform coefficients such that encoding information is indicated by parity of the effective transform coefficients, the encoding being performed by an image encoding apparatus. according to an embodiment.

FIG. 8 is a diagram illustrating encoding effective transform coefficients such that encoding information is indicated by parity of the effective transform coefficients, the encoding being performed by an image encoding apparatus. according to an embodiment.

In detail, FIG. 8 illustrates encoding performed by the image encoding apparatus when an intra-prediction direction of a current coding unit 800 is an intra-prediction direction of an upper coding unit.

As described above with reference to FIG. 3, the image encoding apparatus 600 may determine a candidate transform unit which may include an effective transform coefficient in which encoding information is hidden among at least one transform unit partitioned from a current coding unit. Furthermore, the image encoding apparatus 600 may determine a candidate sub-block which may include an effective transform coefficient in which encoding information is hidden among at least one sub-block included in a transform unit. A case in which the candidate transform unit is a transform unit TU0 of the current coding unit 800 to be first inversely transformed in the raster scan order and the candidate sub-block is a sub-block SB0 of the transform unit TU0 to be lastly scanned when scanning is performed in the backward direction will be described below.

When sub-blocks of the transform unit TU0 are scanned in the backward direction in the up-right diagonal scan order as indicated by reference numeral 810, transform coefficients included in the sub-block SB0, which is a candidate sub-block, may be also scanned in the backward direction in the up-right diagonal scan order. Thus, the difference between a scan position 15 of a final effective transform coefficient 811 of a level 7 and a scan position 5 of an initial effective transform coefficient 812 of a level 2, which are included in the sub-block SB0, is 10 and is thus greater than a first threshold value of 4, and a total number of effective transform coefficients of the sub-block SB0 is seven and is thus greater than a second threshold value of 3. Accordingly, the sub-block SB0 satisfies the data hiding condition.

Since the sub-block SB0 satisfies the data hiding condition, the image encoding apparatus 600 may determine whether the sum of the effective transform coefficients of the sub-block SB0 corresponding to certain scan positions matches encoding information to be hidden. When the sum of the effective transform coefficients does not match the encoding information to be hidden, the encoding apparatus 600 may correct levels of the effective transform coefficients such that the encoding information is hidden by parity of the sum of the effective transform coefficients.

For example, when a scan order of the transform coefficients of the sub-block SB0 is a diagonal direction as indicated by reference numeral 810, the image encoding apparatus 600 may hide a first bit of an mpm index by parity of the sum of effective transform coefficients corresponding to even-numbered scan positions among the transform coefficients of the sub-block SB0, and hide a second bit of the mpm index by parity of the sum of effective transform coefficients corresponding to odd-numbered scan positions. In this case, the sum of effective transform coefficients {1, 4, 7} corresponding to scan positions {6, 8, 14} is 12, i.e., an even number, and the sum of effective transform coefficients {2, 5, 1, 2} corresponding to scan positions {5, 7, 9, 13} is 10, i.e., an even number. Accordingly, the mpm index is a binary number '00' and thus the mpm index may indicate an intra-prediction direction of a left coding unit. As described above, the intra-prediction direction of the current coding unit 800 is the intra-prediction direction of the upper coding unit and thus the sum of effective transform coefficients of the sub-block SB0 corresponding to certain scan positions does not match the encoding information to be hidden. Accordingly, the image encoding apparatus 600 may correct a level of an effective transform coefficient having a least influence on the quality of the image among the effective transform coefficients of the sub-block SB0. For example, the image encoding apparatus 600 may correct a level 4 of an effective transform coefficient 813 of the sub-block SB0 corresponding to a scan position 8 to be 3. The sum of such corrected effective transform coefficients may match the encoding information to be hidden, and encoding/decoding performance may be improved since an influence caused when a bitrate is decreased by data hiding is greater than an influence caused by deterioration of the quality of the image due to the correction of the levels of the effective transform coefficient.

When a level of an effective transform coefficient is corrected to be 0, the image encoding apparatus 600 may not hide the encoding information in the effective transform coefficient. For example, when a level 1 of an effective transform coefficient is corrected to be 0, the corrected transform coefficient is not a non-zero effective transform coefficient. When the level of the effective transform coefficient is corrected to be 0, a total number of effective transform coefficients changes and thus whether the data hiding condition is satisfied may be changed. When the total number of effective transform coefficient changes, an influence caused by a degree of deterioration of the quality of the image due to the correction of the effective transform coefficients may be greater than a degree of improvement of image compression efficiency by reducing a bitrate.

Figure 9:
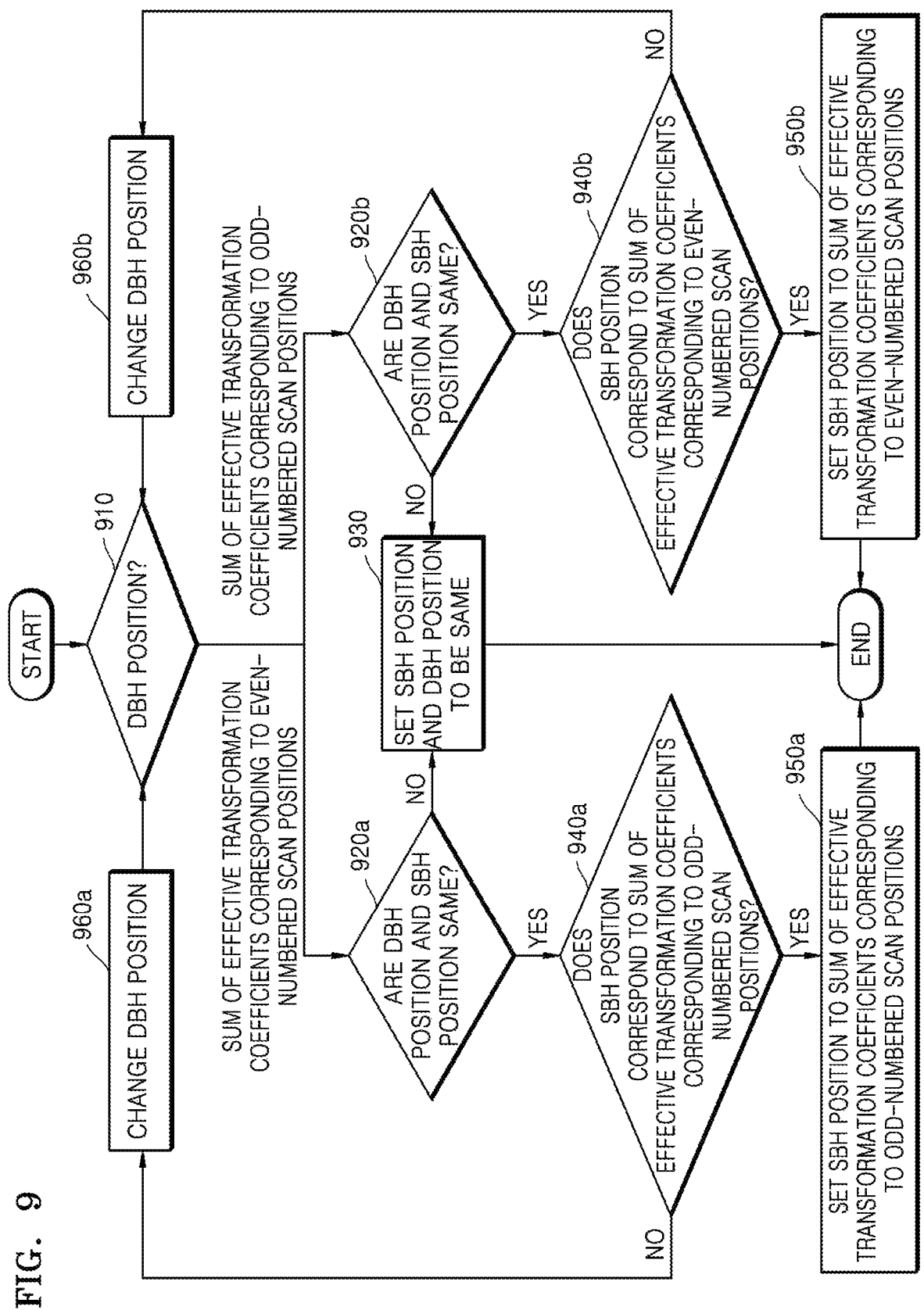
FIG. 9 is a diagram illustrating encoding effective transform coefficients such that an intra-prediction direction and a sign of a first effective transform coefficient are indicated by parity of the effective transform coefficients, the encoding being performed by an image encoding apparatus, according to an embodiment.

FIG. 9 is a diagram illustrating encoding effective transform coefficients such that an intra-prediction direction and a sign of a first effective transform coefficient are indicated by parity of the effective transform coefficients, the encoding being performed by an image encoding apparatus, according to an embodiment.

In FIG. 9, "DBH" stands for data bit hiding and may be understood to mean hiding at least one of encoding information of a coding unit and transformation information of a transform unit by parity of effective transform coefficients. In FIG. 9, "SBH" stands for sign bit hiding and may be understood to mean hiding a sign of an effective transform coefficient by the parity of the effective transform coefficients.

A case in which "DBH" means hiding a first bit of an mpm index by the parity of the effective transform coefficients and "SBH" means hiding a sign of an initial effective transform coefficient of a sub-block by the parity of the effective transform coefficients will be described below.

In operation 910, the image encoding apparatus 600 may determine a DBH position. In detail, the image encoding apparatus 600 may determine a candidate transform unit in which a first bit of an mpm index of a current coding unit may be hidden among at least one transform unit partitioned from the current coding unit. Furthermore, the image encoding apparatus 600 may determine a candidate sub-block in which the first bit of the mpm index of the current coding unit may be hidden among at least one sub-block of a current transform unit. The image encoding apparatus 600 may select one of the sum of effective transform coefficients of the candidate sub-block corresponding to even-numbered scan positions and the sum of effective transform coefficients corresponding to odd-numbered scan positions to hide the first bit of the mpm index. When both the sum of the effective transform coefficients corresponding to the even-numbered scan positions and the sum of the effective transform coefficients corresponding to the odd-numbered scan positions do not match the first bit of the mpm index, the image encoding apparatus 600 may correct an effective transform coefficient having a least influence on the quality of the image to hide the first bit of the mpm index.

In the above-described embodiment of FIG. 8, the intra-prediction direction of the current coding unit 800 is an upper intra-prediction direction, the first bit of the mpm index is 1. However, in the candidate sub-block SB0, which is not corrected, the sum of effective transform coefficients {1, 4, 7} corresponding to even-numbered scan positions {6, 8, 14} is 12, i.e., an even number, and the sum of effective transform coefficients {2, 5, 1, 2} corresponding to odd-numbered scan positions {5, 7, 9, 13} is 10, i.e., an even number. Thus, any one of the sum of the effective transform coefficients {1, 4, 7} and the sum of effective transform coefficients {2, 5, 1, 2} does not match the first bit of the mpm index. Accordingly, the image encoding apparatus 600 may correct the level 4 of the effective transform coefficient 813 corresponding to the scan position 8 and having a least influence on the quality of the image among the effective transform coefficients of the sub-block SB0 to be 3. The image encoding apparatus 600 may hide the first bit of the mpm index in the sum of the effective transform coefficients corresponding to the even-numbered scan positions when the corrected effective transform coefficient 813 corresponds to an odd-numbered scan position, and may hide the first bit of the mpm index in the sum of the effective transform coefficients corresponding to the odd-numbered scan positions when the corrected effective transform coefficient 813 corresponds to an even-numbered scan position. Accordingly, in the embodiment of FIG. 8, the image encoding apparatus 600 may hide the first bit of the mpm index in the sum of the effective transform coefficients corresponding to the even-numbered scan positions according to the scan position 8 of the corrected effective transform coefficient 813.

In operation 920a, when it is determined in operation 910 that the DBH position corresponds to effective transform coefficients of the candidate sub-block corresponding to the even-numbered scan positions, the image encoding apparatus 600 may determine whether the DBH position and an SBH position are the same.

In operation 930, when, although it is determined in operation 920a that the DBH position and the SBH position are the same, DBH and SBH are not contradictory to each other, the image encoding apparatus 600 may set the SBH position and the DBH position to be the same as the sum of the effective transform coefficients of the candidate sub-block corresponding to the even-numbered scan positions. In operation 940a, when it is determined in operation 920a that the DBH position and the SBH position are the same, when DBH and SBH are contradictory to each other, the image encoding apparatus 600 may determine whether the SBH position corresponds to the sum of effective transform coefficients of the candidate sub-block corresponding to the odd-numbered scan positions.

In operation 950a, when it is determined in operation 940a that the SBH position corresponds to the effective transform coefficients of the candidate sub-block corresponding to the odd-numbered scan positions, the image encoding apparatus 600 may set the SBH position to the sum of the effective transform coefficients of the candidate sub-block corresponding to the odd-numbered scan positions, and set the DBH position to the sum of the effective transform coefficients of the candidate sub-block corresponding to the even-numbered scan positions.

In operation 960a, when it is determined in operation 940a that the SBH position does not correspond to the sum of the effective transform coefficients of the candidate sub-block corresponding to the odd-numbered scan positions, the image encoding apparatus 600 may change the DBH position. In detail, the image encoding apparatus 600 may change the candidate sub-block. For example, when the candidate sub-block is a sub-block of a current transform unit to be lastly scanned, the candidate sub-block may be changed to a sub-block to be first scanned or a sub-block to be second scanned.

In the embodiment of FIG. 8, the initial effective transform coefficient 811 of the sub-block SB0 is a positive number but the sum of the effective transform coefficients of the sub-block SB0 corresponding to the even-numbered scan positions becomes 11, i.e., an odd number, due to the corrected effective transform coefficient 813. Thus, when the DBH position and the SBH position are the same in operation 920a, DBH and SBH may be contradictory to each other. In contrast, the sum of the effective transform coefficients of the sub-block SB0 corresponding to the odd-numbered scan positions is 10, i.e., an even number, and thus, in operation 940a, the SBH position may correspond to the sum of the effective transform coefficients of the sub-block SB0 corresponding to the odd-numbered scan positions. Accordingly, the image encoding apparatus 600 may hide the first bit of the mpm index in the sum of the effective transform coefficients of the sub-block SB0 corresponding to the even-numbered scan positions and hide a sign of a first effective transform coefficient of the sub-block SB0 in the sum of the effective transform coefficients of the sub-block SB0 corresponding to the odd-numbered scan positions.

In operation 920b, when it is determined in operation 910 that the DBH position corresponds to the effective transform coefficients of the candidate sub-block corresponding to the odd-numbered scan positions, the image encoding apparatus 600 may determine whether the DBH position and the SBH position are the same. Operations 920b, 940b, 950b, and 960b correspond to operations 920a, 940a, 950a, and 960a and are thus not described again here.

As described above, with a method of hiding data using parity of effective transform coefficients, a bitrate may be decreased and encoding and decoding efficiencies may be improved.

Hereinafter, a method of determining a data unit that is usable when the image decoding apparatus 100 according to an embodiment decodes an image will now be described with reference to FIGS. 10 through 23. Operations of the image encoding apparatus 600 may be similar to or reverse of various embodiments about operations of the image decoding apparatus 100 described below.

Figure 10:
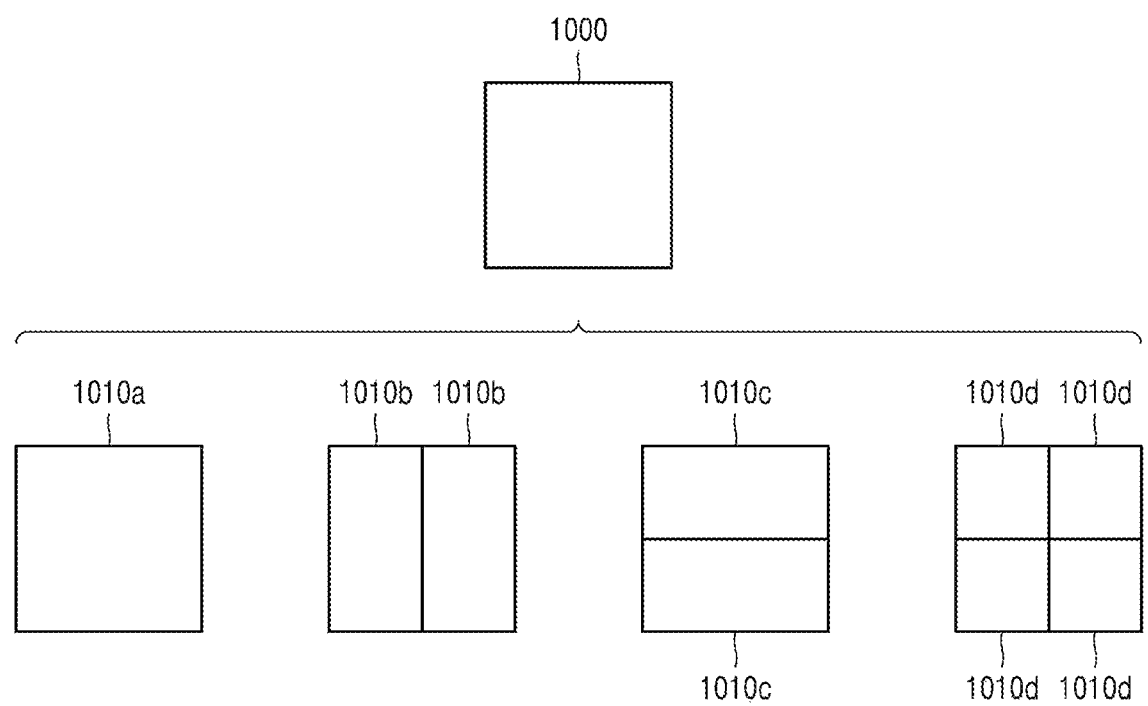
FIG. 10 illustrates processes of determining at least one coding unit as a current coding unit is partitioned, according to an embodiment.

FIG. 10 illustrates processes of determining at least one coding unit as the image decoding apparatus 100 partitions a current coding unit, according to an embodiment.

According to an embodiment, the image decoding apparatus 100 may determine a shape of a coding unit by using block shape information, and determine into which shape a coding unit is partitioned by using partition shape information. That is, a coding unit partitioning method that is indicated by the partition shape information may be determined based on a block shape indicated by the block shape information used by the image decoding apparatus 100.

According to an embodiment, the image decoding apparatus 100 may use block shape information indicating that a current coding unit has a square shape. For example, the image decoding apparatus 100 may determine, according to partition shape information, whether to not partition a square coding unit, to partition the square coding unit vertically, to partition the square coding unit horizontally, or to partition the square coding unit into four coding units. Referring to FIG. 10, when block shape information of a current coding unit 1000 indicates a square shape, the image decoding apparatus 100 may not partition a coding unit 1010a having the same size as the current coding unit 1000 according to partition shape information indicating non-partition, or determine coding units 1010b, 1010c, or 1010d based on partition shape information indicating a certain partitioning method.

Referring to FIG. 10, the image decoding apparatus 100 may determine two coding units 1010b by partitioning the current coding unit 1000 in a vertical direction based on partition shape information indicating partitioning in a vertical direction, according to an embodiment. The image decoding apparatus 100 may determine two coding units 1010c by partitioning the current coding unit 1000 in a horizontal direction based on partition shape information indicating partitioning in a horizontal direction. The image decoding apparatus 100 may determine four coding units 1010d by partitioning the current coding unit 1000 in vertical and horizontal directions based on partition shape information indicating partitioning vertical and horizontal directions. However, a partition shape into which a square coding unit may be partitioned is not limited to the above shapes, and may include any shape indicatable by partition shape information. Certain partition shapes into which a square coding unit are partitioned will now be described in detail through various embodiments.

FIG. 11 illustrates processes of determining at least one coding unit as the image decoding apparatus 100 partitions a coding unit having a non-square shape, according to an embodiment.

According to an embodiment, the image decoding apparatus 100 may use block shape information indicating that a current coding unit has a non-square shape. The image decoding apparatus 100 may determine, according to partition shape information, whether to not partition the non-square current coding unit or to partition the non-square current coding unit via a certain method. Referring to FIG. 11, when block shape information of a current coding unit 1100 or 1150 indicates a non-square shape, the image decoding apparatus 100 may not partition coding units 1110 or 1160 having the same size as the current coding unit 1100 or 1150 according to partition shape information indicating non-partition, or determine coding units 1120a, 1120b, 1130a, 1130b, 1130c, 1170a, 1170b, 1180a, 1180b, and 1180c based on partition shape information indicating a certain partitioning method. A certain partitioning method of partitioning a non-square coding unit will now be described in detail through various embodiments.

According to an embodiment, the image decoding apparatus 100 may determine a shape into which a coding unit is partitioned by using partition shape information, and in this case, the partition shape information may indicate the number of at least one coding units generated as the coding unit is partitioned. Referring to FIG. 11, when partition shape information indicates that the current coding unit 1100 or 1150 is partitioned into two coding units, the image decoding apparatus 100 may determine two coding units 1120a and 1120b or 1170a and 1170b included in the current coding unit 1100 or 1150 by partitioning the current coding unit 1100 or 1150 based on the partition shape information.

According to an embodiment, when the image decoding apparatus 100 partitions the current coding unit 1100 or 1150 having a non-square shape based on partition shape information, the image decoding apparatus 100 may partition the current coding unit 1100 or 1150 while considering locations of long sides of the current coding unit 1100 or 1150 having a non-square shape. For example, the image decoding apparatus 100 may determine a plurality of coding units by partitioning the current coding unit 1100 or 1150 in a direction of partitioning the long sides of the current coding unit 1100 or 1150 considering a shape of the current coding unit 1100 or 1150.

According to an embodiment, when partition shape information indicates that a coding unit is partitioned into an odd number of blocks, the image decoding apparatus 100 may determine the odd number of coding units included in the current coding unit 1100 or 1150. For example, when partition shape information indicates that the current coding unit 1100 or 1150 is partitioned into three coding units, the image decoding apparatus 100 may partition the current coding unit 1100 or 1150 into three coding units 1130a, 1130b, and 1130c or 1180a, 1180b, and 1180c. According to an embodiment, the image decoding apparatus 100 may determine the odd number of coding units included in the current coding unit 1100 or 1150, and the sizes of the determined coding units may not be the all same. For example, the size of coding unit 1130b or 1180b from among the determined odd number of coding units 1130a, 1130b, and 1130c or 1180a, 1180b, and 1180c may be different from the sizes of coding units 1130a and 1130c or 1180a and 1180c. That is, coding units that may be determined as the current coding unit 1100 or 1150 is partitioned may have a plurality of types of sizes, and in some cases, the coding units 1130a, 1130b, and 1130c or 1180a, 1180b, and 1180c may have different sizes.

According to an embodiment, when partition shape information indicates that a coding unit is partitioned into an odd number of blocks, the image decoding apparatus 100 may determine the odd number of coding units included in the current coding unit 1100 or 1150, and in addition, may set a certain limit on at least one coding unit from among the odd number of coding units generated via partitioning. Referring to FIG. 11, the image decoding apparatus 100 may differentiate decoding processes performed on the coding unit 1130b or 1180b located at the center from among the three coding units 1130a, 1130b, and 1130c or 1180a, 1180b, and 1180c generated as the current coding unit 1100 or 1150 is partitioned from the other coding units 1130a and 1130c or 1180a and 1180c. For example, the image decoding apparatus 100 may limit the coding unit 1130b or 1180b located at the center to be no longer partitioned unlike the other coding units 1130a and 1130c or 1180a and 1180c, or to be partitioned only a certain number of times.

Figure 12:
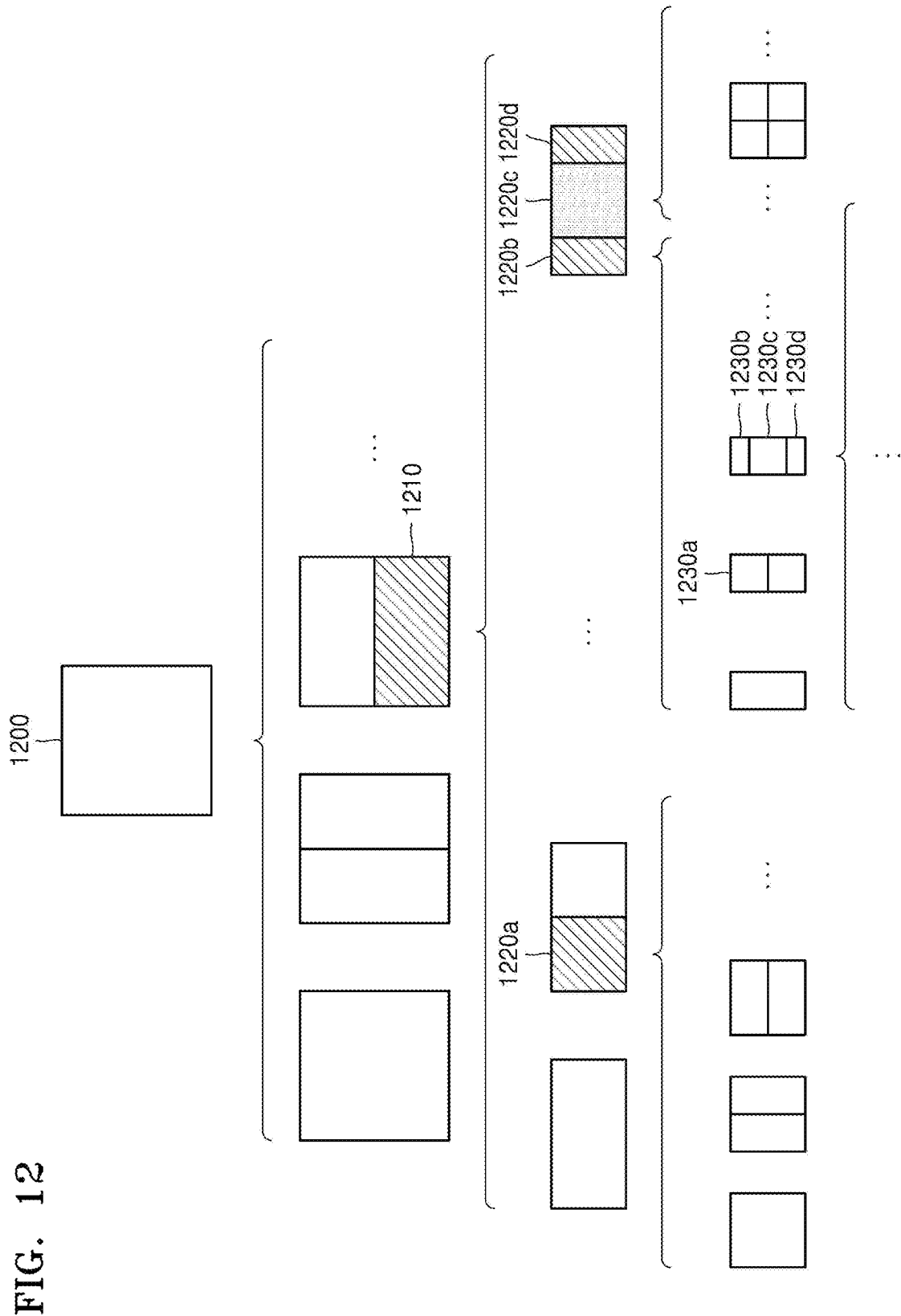
FIG. 12 illustrates processes of partitioning a coding unit, based on at least one of a block shape information and partition shape information, according to an embodiment.

FIG. 12 illustrates processes in which the image decoding apparatus 100 partitions a coding unit, based on at least one of a block shape information and partition shape information, according to an embodiment.

According to an embodiment, the image decoding apparatus 100 may determine a first coding unit 1200 having a square shape to be partitioned or not to be partitioned into coding units, based on at least one of block shape information and partition shape information. According to an embodiment, when the partition shape information indicates that the first coding unit 1200 is partitioned in a horizontal direction, the image decoding apparatus 100 may determine a second coding unit 1210 by partitioning the first coding unit 1200 in the horizontal direction. A first coding unit, a second coding unit, and a third coding unit used according to an embodiment are terms used to indicate a relation between before and after partitioning a coding unit. For example, a second coding unit may be determined by partitioning a first coding unit, and a third coding unit may be determined by partitioning a second coding unit. Hereinafter, it will be understood that relations between first through third coding units are in accordance with the features described above.

According to an embodiment, the image decoding apparatus 100 may determine the determined second coding unit 1210 to be partitioned or not to be partitioned into coding units, based on at least one of block shape information and partition shape information. Referring to FIG. 12, the image decoding apparatus 100 may partition the second coding unit 1210, which has a non-square shape and is determined by partitioning the first coding unit 1200, into at least one third coding unit 1220a, 1220b, 1220c, or 1220d, or may not partition the second coding unit 1210, based on at least one of block shape information and partition shape information. The image decoding apparatus 100 may obtain at least one of the block shape information and the partition shape information, and obtain a plurality of second coding units (for example, the second coding units 1210) having various shapes by partitioning the first coding unit 1200 based on at least one of the obtained block shape information and partition shape information, wherein the second coding unit 1210 may be partitioned according to a method of partitioning the first coding unit 1200 based on at least one of the block shape information and the partition shape information. According to an embodiment, when the first coding unit 1200 is partitioned into the second coding units 1210 based on at least one of block shape information and partition shape information with respect to the first coding unit 1200, the second coding unit 1210 may also be partitioned into third coding units (for example, the third coding units 1220a through 1220d) based on at least one of block shape information and partition shape information with respect to the second coding unit 1210. That is, a coding unit may be recursively partitioned based on at least one of partition shape information and block shape information related to each coding unit. Accordingly, a square coding unit may be determined from a non-square coding unit, and such a square coding unit may be recursively partitioned such that a non-square coding unit is determined. Referring to FIG. 12, a certain coding unit (for example, a coding unit located at the center or a square coding unit) from among the odd number of third coding units 1220b, 1220c, and 1220d determined when the second coding unit 1210 having a non-square shape is partitioned may be recursively partitioned. According to an embodiment, the third coding unit 1220c having a square shape from among the third coding units 1220b through 1220d may be partitioned in a horizontal direction into a plurality of fourth coding units. A fourth coding unit 1240 having a non-square shape from among the plurality of fourth coding units may again be partitioned into a plurality of coding units. For example, the fourth coding unit 1240 having a non-square shape may be partitioned into an odd number of coding units.

A method that may be used to recursively partitioned a coding unit will be described below through various embodiments.

According to an embodiment, the image decoding apparatus 100 may determine each of the third coding units 1220a, 1220b, 1220c, and 1220d to be partitioned into coding units or may determine the second coding unit 1210 not to be partitioned, based on at least one of block shape information and partition shape information. The image decoding apparatus 100 may partition the second coding unit 1210 having a non-square shape into the odd number of third coding units 1220b, 1220c, and 1220d, according to an embodiment. The image decoding apparatus 100 may set a certain limit on a certain third coding unit from among the third coding units 1220b, 1220c, and 1220d. For example, the image decoding apparatus 100 may limit that the third coding unit 1220c located at the center of the third coding units 1220b, 1220c, and 1220d is no longer partitioned, or is partitioned into a settable number of times. Referring to FIG. 12, the image decoding apparatus 100 may limit that the third coding unit 1220c located at the center of the third coding units 1220b, 1220c, and 1220d included in the second coding unit 1210 having a non-square shape is no longer partitioned, is partitioned into a certain partition shape (for example, partitioned into four coding units or partitioned into shapes corresponding to those into which the second coding unit 1210 is partitioned), or is partitioned only a certain number of times (for example, partitioned only n times wherein n>0). However, such limits on the third coding unit 1220c located at the center are only examples and should not be interpreted as being limited by those examples, but should be interpreted as including various limits as long as the third coding unit 1220c located at the center are decoded differently from the other third coding units 1220b and 1220d.

According to an embodiment, the image decoding apparatus 100 may obtain at least one of block shape information and partition shape information used to partition a current coding unit from a certain location in the current coding unit.

Figure 13:
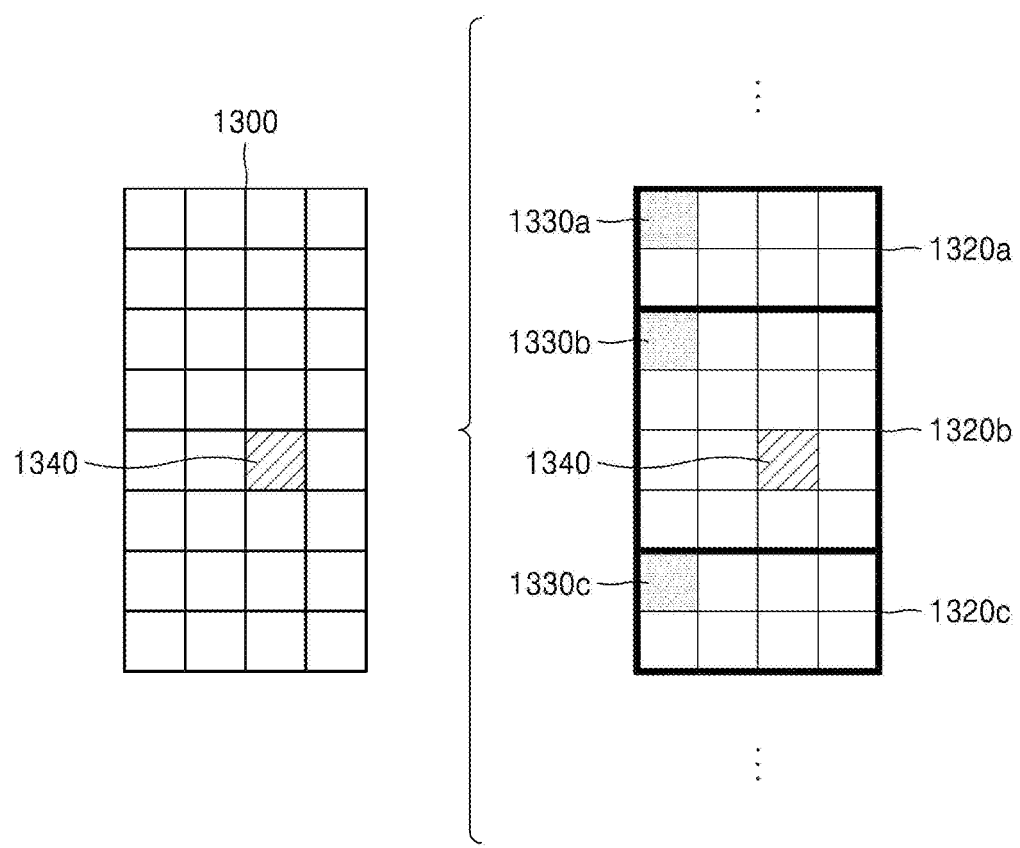
FIG. 13 illustrates a method of determining a certain coding unit from among an odd number of coding units, according to an embodiment.

FIG. 13 illustrates a method of determining, by the image decoding apparatus 100, a certain coding unit from among an odd number of coding units, according to an embodiment. Referring to FIG. 13, at least one of block shape information and partition shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and partition shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The image decoding apparatus 100 may determine that a current coding unit is partitioned into coding units having various shapes and sizes or is not partitioned by obtaining at least one of block shape information and partition shape information from a certain location.

According to an embodiment, the image decoding apparatus 100 may select one coding unit when a current coding unit is partitioned into a certain number of coding units. A method of selecting one of a plurality of coding units may vary, and details thereof will be described below through various embodiments.

According to an embodiment, the image decoding apparatus 100 may partition a current coding unit into a plurality of coding units, and determine a coding unit at a certain location.

FIG. 13 illustrates a method of determining, by the image decoding apparatus 100, a coding unit at a certain location from among an odd number of coding units, according to an embodiment.

According to an embodiment, the image decoding apparatus 100 may use information indicating a location of each of the odd number of coding units so as to determine a coding unit located at the center from among the odd number of coding units. Referring to FIG. 13, the image decoding apparatus 100 may determine the odd number of coding units 1320a, 1320b, and 1320c by partitioning the current coding unit 1300. The image decoding apparatus 100 may determine the center coding unit 1320b by using information about the locations of the odd number of coding units 1320a, 1320b, and 1320c. For example, the image decoding apparatus 100 may determine the coding unit 1320b located at the center by determining the locations of the coding units 1320a, 1320b, and 1320c based on information indicating locations of certain samples included in the coding units 1320a, 1320b, and 1320c. In detail, the image decoding apparatus 100 may determine the coding unit 1320b located at the center by determining the locations of the coding units 1320a, 1320b, and 1320c based on information indicating locations of upper left samples 1330a through 1330c of the coding units 1320a, 1320b, and 1320c.

According to an embodiment, the information indicating the locations of the upper left samples 1330a, 1330b, and 1330c included in the coding units 1320a, 1320b, and 1320c respectively may include information about a location or coordinates of the coding units 1320*a*, 1320*b*, and 1320*c* in a picture. According to an embodiment, the information indicating the locations of the upper left samples 1330*a*, 1330*b*, and 1330*c* included in the coding units 1320*a*, 1320*b*, and 1320*c* respectively may include information indicating widths or heights of the coding units 1320*a*, 1320*b*, and 1320*c* included in the current coding unit 1300, and such widths or heights may correspond to information indicating differences between coordinates of the coding units 1320*a*, 1320*b*, and 1320*c* in a picture. That is, the image decoding apparatus 100 may determine the coding unit 1320*b* located at the center by directly using the information about the locations or coordinates of the coding units 1320*a*, 1320*b*, and 1320*c* in a picture or by using information about the widths or heights of the coding units 1320*a*, 1320*b*, and 1320*c* corresponding to the differences between coordinates.

According to an embodiment, the information indicating the location of the upper left sample 1330*a* of the upper coding unit 1320*a* may indicate (xa, ya) coordinates, the information indicating the location of the upper left sample 1330*b* of the center coding unit 1320*b* may indicate (xb, yb) coordinates, and the information indicating the location of the upper left sample 1330*c* of the lower coding unit 1320*c* may indicate (xc, yc) coordinates. The image decoding apparatus 100 may determine the center coding unit 1320*b* by using the coordinates of the upper left samples 1330*a*, 1330*b*, and 1330*c* respectively included in the coding units 1320*a*, 1320*b*, and 1320*c*. For example, when the coordinates of the upper left samples 1330*a*, 1330*b*, and 1330*c* are arranged in an ascending order or descending order, the coding unit 1320*b* including the coordinates (xb, yb) of the sample 1330*b* located at the center may be determined as a coding unit located at the center from among the coding units 1320*a*, 1320*b*, and 1320*c* determined when the current coding unit 1300 is partitioned. However, coordinates indicating the locations of the upper left samples 1330*a* through 1330*c* may be coordinates indicating absolute locations in a picture, and in addition, (dxb, dyb) coordinates, i.e., information indicating a relative location of the upper left sample 1330*b* of the center coding unit 1320*b*, and (dxc, dyc) coordinates, i.e., information indicating a relative location of the upper left sample 1330*c* of the lower coding unit 1320*c*, may be used based on the location of the upper left sample 1330*a* of the upper coding unit 1320*a*. Also, a method of determining a coding unit at a certain location by using, as information indicating locations of samples included in coding units, coordinates of the samples is not limited to the above, and various arithmetic methods capable of using coordinates of samples may be used.

According to an embodiment, the image decoding apparatus 100 may partition the current coding unit 1300 into the plurality of coding units 1320*a*, 1320*b*, and 1320*c*, and select a coding unit from the coding units 1320*a* through 1320*c* according to a certain standard. For example, the image decoding apparatus 100 may select the coding unit 1320*b* having a different size from among the coding units 1320*a*, 1320*b*, and 1320*c*.

According to an embodiment, the image decoding apparatus 100 may determine widths or heights of the coding units 1320*a*, 1320*b*, and 1320*c* by respectively using the (xa, ya) coordinates, i.e., the information indicating the location of the upper left sample 1330*a* of the upper coding unit 1320*a*, the (xb, yb) coordinates, i.e., the information indicating the location of the upper left sample 1330*b* of the center coding unit 1320*b*, and the (xc, yc) coordinates, i.e., the information indicating the location of the upper left sample 1330*c* of the lower coding unit 1320*c*. The image decoding apparatus 100 may determine the sizes of the coding units 1320*a*, 1320*b*, and 1320*c* by respectively using the coordinates (xa, ya), (xb, yb), and (xc, yc) indicating the locations of the coding units 1320*a*, 1320*b*, and 1320*c*.

According to an embodiment, the image decoding apparatus 100 may determine the width of the upper coding unit 1320*a* to be xb-xa, and the height to be yb-ya. According to an embodiment, the image decoding apparatus 100 may determine the width of the center coding unit 1320*b* to be xc-xb, and the height to be yc-yb. According to an embodiment, the image decoding apparatus 100 may determine the width or height of the lower coding unit 1320*c* by using the width and height of the current coding unit 1300 and the widths and heights of the upper coding unit 1320*a* and center coding unit 1320*b*. The image decoding apparatus 100 may determine a coding unit having a different size from other coding units based on the determined widths and heights of the coding units 1320*a*, 1320*b*, and 1320*c*. Referring to FIG. 13, the image decoding apparatus 100 may determine the center coding unit 1320*b* having a size different from those of the upper coding unit 1320*a* and lower coding unit 1320*c* as a coding unit at a certain location. However, processes of the image decoding apparatus 100 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the image decoding apparatus 100 may select a coding unit at a certain location from among an odd number of coding units determined when a current coding unit is partitioned, while considering a shape of the current coding unit. For example, when the current coding unit has a non-square shape in which a width is longer than a height, the image decoding apparatus 100 may determine a coding unit at a certain location in a horizontal direction. In other words, the image decoding apparatus 100 may determine one of coding units having a different location in the horizontal direction and set a limit on the one coding unit. When the current coding unit has a non-square shape in which a height is longer than a width, the image decoding apparatus 100 may determine a coding unit at a certain location in a vertical direction. That is, the image decoding apparatus 100 may determine one of coding units having a different location in the vertical direction and set a limit on the one coding unit.

According to an embodiment, the image decoding apparatus 100 may use information indicating a location of each of an even number of coding units so as to determine a coding unit at a certain location from among the even number of coding units. The image decoding apparatus 100 may determine the even number of coding units by partitioning a current coding unit, and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is partitioned into a plurality of coding units, certain information about a coding unit at a certain location during partitioning processes may be used to determine the coding unit at the certain location from among the plurality of coding units. For example, the image decoding apparatus 100 may use at least one of block shape information and partition shape information stored in a sample included in a center coding unit during partitioning processes so as to determine a coding unit located at the center from among a plurality of coding units obtained by partitioning a current coding unit.

Referring to FIG. 13, the image decoding apparatus 100 may partition the current coding unit 1300 into the plurality of coding units 1320*a*, 1320*b*, and 1320*c* based on at least one of block shape information and partition shape information, and determine the coding unit 1320*b* located at the center from among the plurality of coding units 1320*a*, 1320*b*, and 1320*c*. In addition, the image decoding apparatus 100 may determine the coding unit 1320*b* located at the center considering a location from which at least one of the block shape information and the partition shape information is obtained. That is, at least one of the block shape information and the partition shape information of the current coding unit 1300 may be obtained from the sample 1340 located at the center of the current coding unit 1300, and when the current coding unit 1300 is partitioned into the plurality of coding units 1320*a*, 1320*b*, and 1320*c* based on at least one of the block shape information and the partition shape information, the coding unit 1320*b* including the sample 1340 may be determined as a coding unit located at the center. However, information used to determine a coding unit located at the center is not limited to at least one of the block shape information and the partition shape information, and various types of information may be used while determining a coding unit located at the center.

According to an embodiment, certain information for identifying a coding unit at a certain location may be obtained from a certain sample included in a coding unit to be determined. Referring to FIG. 13, the image decoding apparatus 100 may use at least one of block shape information and partition shape information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320*a*, 1320*b*, and 1320*c* determined when the current coding unit 1300 is partitioned. That is, the image decoding apparatus 100 may determine the sample at the certain location considering a block shape of the current coding unit 1300, and determine and set a certain limit on the coding unit 1320*b* including a sample from which certain information (for example, at least one of block shape information and partition shape information) is obtainable, from among the plurality of coding units 1320*a*, 1320*b*, and 1320*c* determined when the current coding unit 1300 is partitioned. Referring to FIG. 13, according to an embodiment, the image decoding apparatus 100 may determine, as a sample from which certain information is obtainable, the sample 1340 located at the center of the current coding unit 1300, and set a certain limit on the coding unit 1320*b* including such a sample 1340 during decoding processes. However, a location of a sample from which certain information is obtainable is not limited to the above, and may be a sample at an arbitrary location included in the coding unit 1320*b* determined to set a limit.

According to an embodiment, a location of a sample from which certain information is obtainable may be determined according to a shape of the current coding unit 1300. According to an embodiment, block shape information may determine whether a shape of a current coding unit is square or non-square, and determine a location of a sample from which certain information is obtainable according to the shape. For example, the image decoding apparatus 100 may determine, as a sample from which certain information is obtainable, a sample located on a boundary of partitioning at least one of a width and a height of a current coding unit into halves by using at least one of information about the width of the current coding unit and information about the height of the current coding unit. As another example, when block shape information related to a current coding unit indicates a non-square shape, the image decoding apparatus 100 may determine, as a sample from which certain information is obtainable, one of samples adjacent to a boundary of partitioning long sides of the current coding unit into halves.

According to an embodiment, when a current coding unit is partitioned into a plurality of coding units, the image decoding apparatus 100 may use at least one of block shape information and partition shape information so as to determine a coding unit at a certain location from among the plurality of coding units. According to an embodiment, the image decoding apparatus 100 may obtain at least one of block shape information and partition shape information from a sample at a certain location included in a coding unit, and may partition a plurality of coding units generated as a current coding unit is partitioned by using at least one of the partition shape information and the block shape information obtained from the sample at the certain location included in each of the plurality of coding units. That is, a coding unit may be recursively partitioned by using at least one of block shape information and partition shape information obtained from a sample at a certain location included in each coding unit. Since processes of recursively partitioning a coding unit have been described above with reference to FIG. 12, details thereof are not provided again.

According to an embodiment, the image decoding apparatus 100 may determine at least one coding unit by partitioning a current coding unit, and determine an order of decoding the at least one coding unit according to a certain block (for example, the current coding unit).

Figure 14:
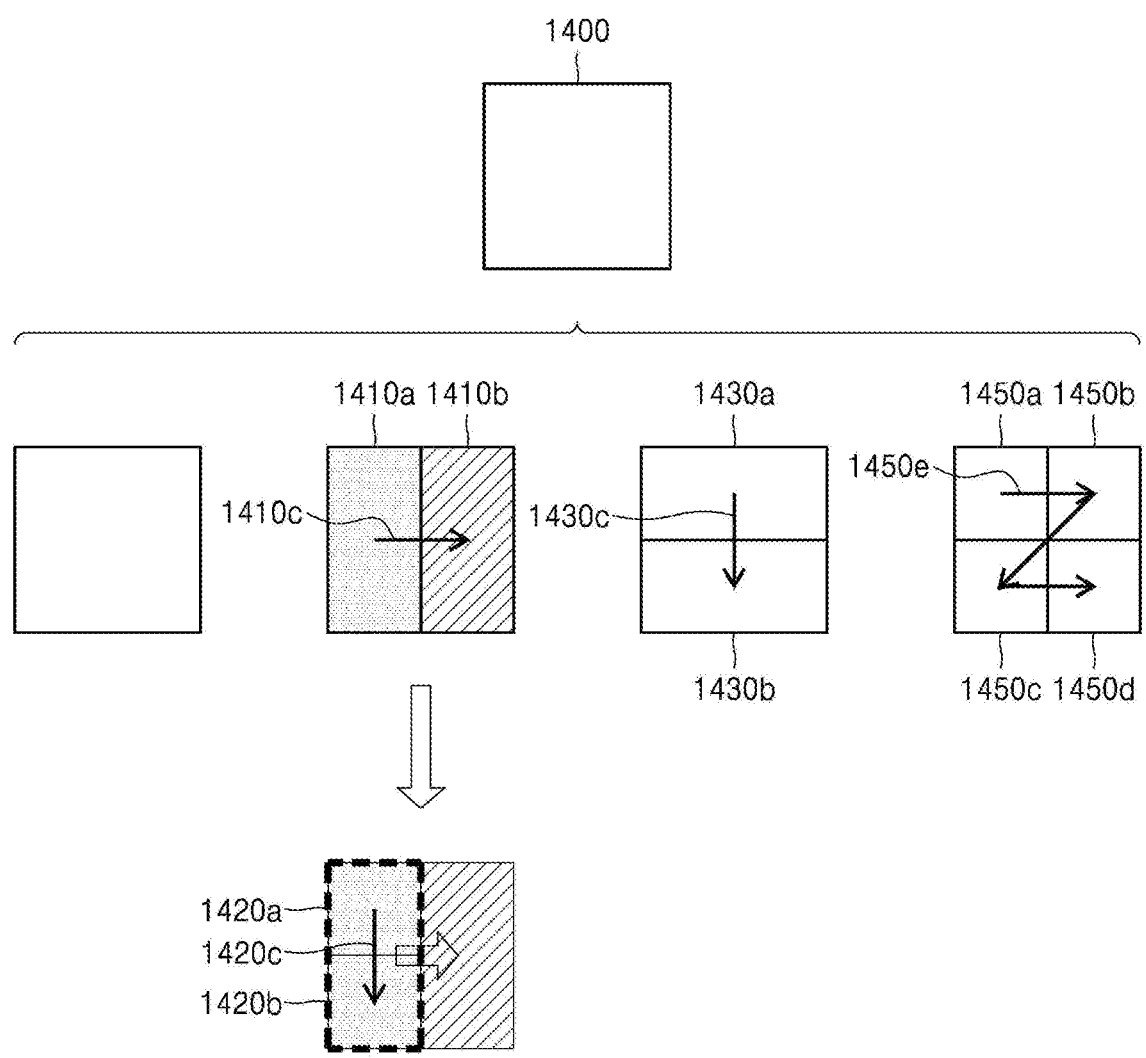
FIG. 14 illustrates an order of processing a plurality of coding units when the plurality of coding units are determined by partitioning a current coding unit, according to an embodiment.

FIG. 14 illustrates an order of processing a plurality of coding units when the plurality of coding units are determined when the image decoding apparatus 100 partitions a current coding unit, according to an embodiment.

According to an embodiment, the image decoding apparatus 100 may determine second coding units 1410*a* and 1410*b* by partitioning a first coding unit 1400 in a vertical direction, determine second coding units 1430*a* and 1430*b* by partitioning the first coding unit 1400 in a horizontal direction, or determine second coding units 1450*a*, 1450*b*, 1450*c*, and 1450*d* by partitioning the first coding unit 140 in horizontal and vertical directions, according to block shape information and partition shape information.

Referring to FIG. 14, the image decoding apparatus 100 may determine the second coding units 1410*a* and 1410*b*, which are determined by partitioning the first coding unit 1400 in the vertical direction, to be processed in a horizontal direction 1410*c*. The image decoding apparatus 100 may determine the second coding units 1430*a* and 1430*b*, which are determined by partitioning the first coding unit 1400 in the horizontal direction, to be processed in a vertical direction 1430*c*. The image decoding apparatus 100 may determine the second coding units 1450*a*, 1450*b*, 1450*c*, and 1450*d*, which are determined by partitioning the first coding unit 1400 in the vertical and horizontal directions, to be processed according to a certain order in which coding units located in one row is processed and then coding units located in a next row is processed (for example, a raster scan order or a z-scan order 1450*e*).

According to an embodiment, the image decoding apparatus 100 may recursively partition coding units. Referring to FIG. 14, the image decoding apparatus 100 may determine the plurality of second coding units 1410*a* and 1410*b*, 1430*a* and 1430*b*, or 1450*a*, 1450*b*, 1450*c*, and 1450*d* by partitioning the first coding unit 1400, and recursively partition each of the plurality of second coding units 1410*a* and 1410*b*, 1430*a* and 1430*b*, or 1450*a*, 1450*b*, 1450*c*, and 1450*d*. A method of partitioning the plurality of second coding units 1410*a* and 1410*b*, 1430*a* and 1430*b*, or 1450*a*, 1450*b*, 1450*c*, and 1450*d* may correspond to a method of partitioning the first coding unit 1400. Accordingly, each of the plurality of second coding units 1410*a* and 1410*b*, 1430*a* and 1430*b*, or 1450*a*, 1450*b*, 1450*c*, and 1450*d* may be independently partitioned into a plurality of coding units. Referring to FIG. 14, the image decoding apparatus 100 may determine the second coding units 1410*a* and 1410*b* by partitioning the first coding unit 1400 in the vertical direction, and in addition, determine each of the second coding units 1410*a* and 1410*b* to be independently partitioned or not partitioned.

According to an embodiment, the image decoding apparatus 100 may partition the second coding unit 1410*a* at the left in a horizontal direction into third coding units 1420*a* and 1420*b*, and may not partition the second coding unit 1410*b* at the right.

According to an embodiment, an order of processing coding units may be determined based on partition processes of coding units. In other words, an order of processing coding units that are partitioned may be determined based on an order of processing coding units before being partitioned. The image decoding apparatus 100 may determine an order of processing the third coding units 1420*a* and 1420*b* determined when the second coding unit 1410*a* at the left is partitioned independently from the second coding unit 1410*b* at the right. Since the third coding units 1420*a* and 1420*b* are determined when the second coding unit 1410*a* at the left is partitioned in a horizontal direction, the third coding units 1420*a* and 1420*b* may be processed in a vertical direction 1420*c*. Also, since an order of processing the second coding unit 1410*a* at the left and the second coding unit 1410*b* at the right corresponds to the horizontal direction 1410*c*, the second coding unit 1410*b* at the right may be processed after the third coding units 1420*a* and 1420*b* included in the second coding unit 1410*a* at the left are processed in the vertical direction 1420*c*. The above descriptions are related processes of determining an order of processing coding units according to coding units before being partitioned, but such processes are not limited to the above embodiments, and any method of independently processing, in a certain order, coding units partitioned into various shapes may be used.

Figure 15:
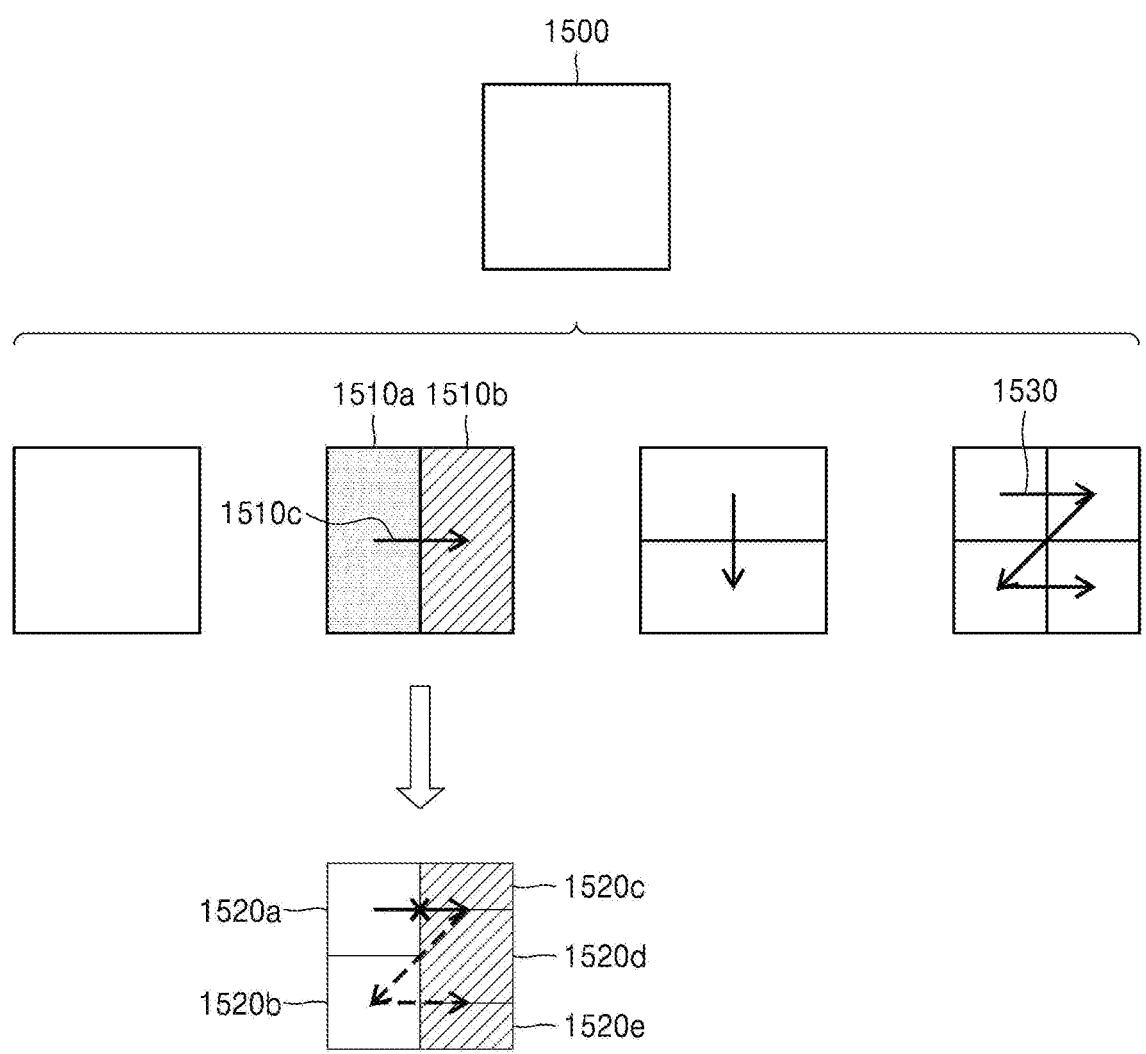
FIG. 15 illustrates processes of determining that a current coding unit is partitioned into an odd number of coding units when coding units are not processable in a certain order, according to an embodiment.

FIG. 15 illustrates processes of determining that a current coding unit is partitioned into an odd number of coding units when coding units are not processable in a certain order by the image decoding apparatus 100, according to an embodiment.

According to an embodiment, the image decoding apparatus 100 may determine that a current coding unit is partitioned into an odd number of coding units based on obtained block shape information and partition shape information. Referring to FIG. 15, a first coding unit 1500 having a square shape may be partitioned into second coding units 1510*a* and 1510*b* having a non-square shape, and the second coding units 1510*a* and 1510*b* may be independently respectively partitioned into third coding units 1520*a* and 1520*b*, and 1520*c*, 1520*d*, and 1520*e*. According to an embodiment, the image decoding apparatus 100 may partition the second coding unit 1510*a* at the left from among the second coding units 1510*a* and 1510*b* into a horizontal direction to determine the plurality of third coding units 1520*a* and 1520*b*, and partition the second coding unit 1510*b* at the right into the odd number of third coding units 1520*c*, 1520*d*, and 1520*e*.

According to an embodiment, the image decoding apparatus 100 may determine whether a coding unit partitioned into an odd number exists by determining whether the third coding units 1520*a*, 1520*b*, 1520*c*, 1520*d*, and 1520*e* are processable in a certain order. Referring to FIG. 15, the image decoding apparatus 100 may determine the third coding units 1520*a* through 1520*e* by recursively partitioning the first coding unit 1500. The video decoding apparatus 100 may determine whether any of the first coding unit 1500, the second coding units 1510*a* and 1510*b*, and the third coding units 1520*a* and 1520*b*, and 1520*c* to 1520*e* is partitioned into an odd number of coding units, based on at least one of the block shape information and the partition shape information. For example, the second coding unit 1510*b* at the right from among the second coding units 1510*a* and 1510*b* may be partitioned into the odd number of third coding units 1520*c* through 1520*e*. An order of processing a plurality of coding units included in the first coding unit 1500 may be a certain order (for example, a z-scan order 1530), and the image decoding apparatus 100 may determine whether the third coding units 1520*c*, 1520*d*, and 1520*e* determined when the second coding unit 1510*b* at the right is partitioned into an odd number satisfy a condition of being processable according to the certain order.

According to an embodiment, the image decoding apparatus 100 may determine whether the third coding units 1520*a*, 1520*b*, 1520*c*, 1520*d*, and 1520*e* included in the first coding unit 1500 satisfy a condition of being processable according to a certain order, wherein the condition is related to whether at least one of a width and a height of each of the second coding units 1510*a* and 1510*b* is partitioned into halves according to boundaries of the third coding units 1520*a*, 1520*b*, 1520*c*, 1520*d*, and 1520*e*. For example, the third coding units 1520*a* and 1520*b* determined when the height of the second coding unit 1510*a* at the left and having a non-square shape is partitioned into halves satisfy the condition, but it may be determined that the third coding units 1520*c*, 1520*d*, and 1520*e* do not satisfy the condition because the boundaries of the third coding units 1520*c*, 1520*d*, and 1520*e* that are determined when the second coding unit 1510*b* at the right is partitioned into three coding units do not partition the width or height of the second coding unit 1510*b* at the right into halves. The image decoding apparatus 100 may determine disconnection of a scan order when the condition is not satisfied, and determine that the second coding unit 1510*b* at the right is partitioned into the odd number of coding units, based on a result of the determination. According to an embodiment, the image decoding apparatus 100 may set a certain limit on a coding unit at a certain location from among an odd number of coding units obtained by partitioning a coding unit, and since such a limit or certain location has been described above through various embodiments, details thereof are not provided again.

Figure 16:
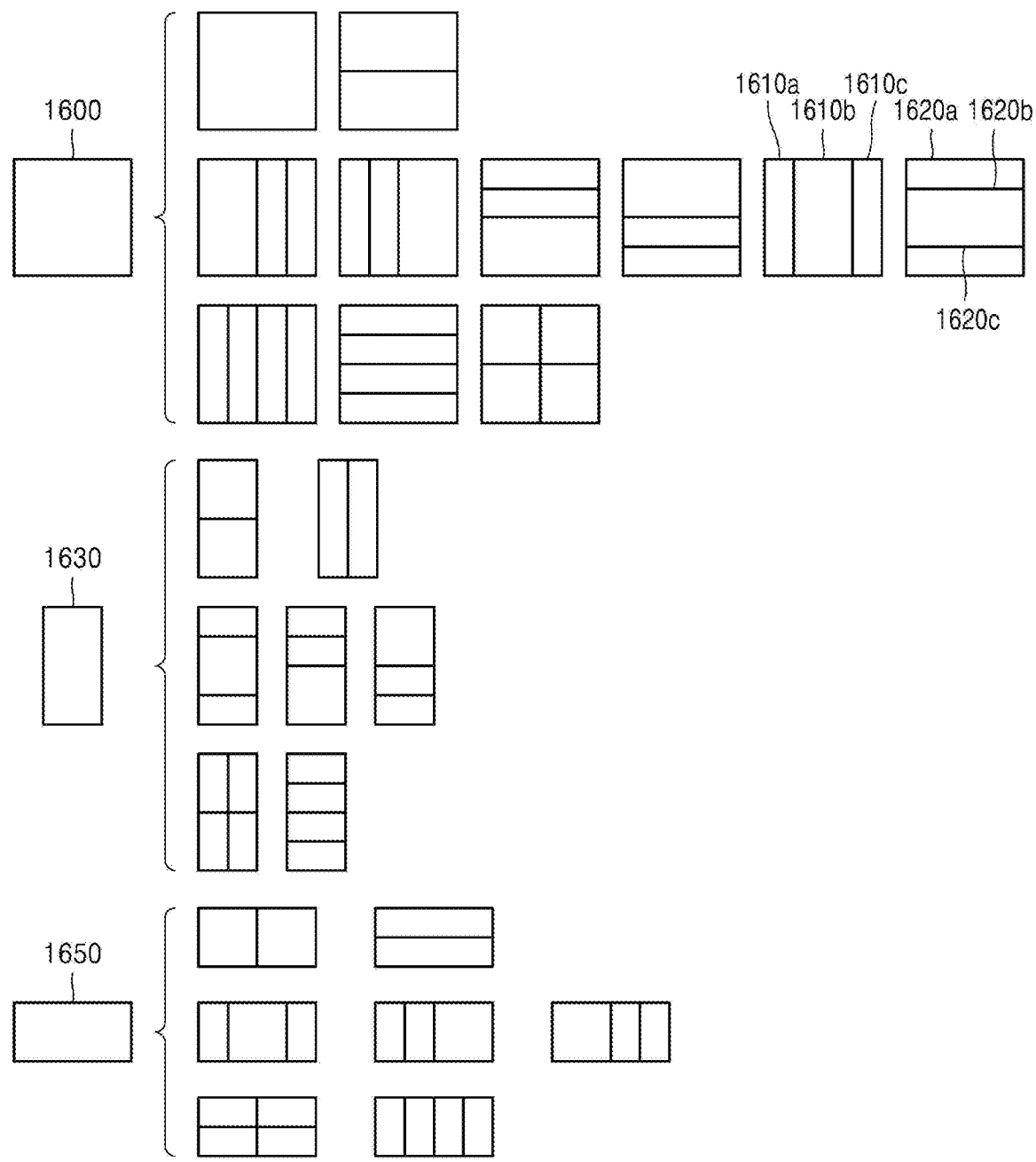
FIG. 16 illustrates processes of determining at least one coding unit by partitioning a first coding unit, according to an embodiment.

FIG. 16 illustrates processes of determining at least one coding unit when the image decoding apparatus 100 partitions a first coding unit 1600, according to an embodiment. According to an embodiment, the image decoding apparatus 100 may partition the first coding unit 1600 based on at least one of block shape information and partition shape information obtained through the obtainer. The first coding unit 1600 having a square shape may be partitioned into four coding units having a square shape or a plurality of coding units having a non-square shape. For example, referring to FIG. 16, when block shape information indicates that the first coding unit 1600 is a square and partition shape information indicates a partition into non-square coding units, the image decoding apparatus 100 may partition the first coding unit 1600 into a plurality of non-square coding units. In detail, when partition shape information indicates that an odd number of coding units are determined by partitioning the first coding unit 1600 in a horizontal direction or a vertical direction, the image decoding apparatus 100 may determine, as the odd number of coding units, second coding units 1610a, 1610b, and 1610c by partitioning the first coding unit 1600 having a square shape in a vertical direction, or second coding units 1610a, 1610b, and 1610c by partitioning the first coding unit 1600 in a horizontal direction.

According to an embodiment, the image decoding apparatus 100 may determine whether the second coding units 1610a, 1610b, and 1610c, and 1620a, 1620b, and 1620c included in the first coding unit 1600 satisfy a condition of being processable in a certain order, wherein the condition is related to whether at least one of a width and a height of the first coding unit 1600 is partitioned into halves according to boundaries of the second coding units 1610a, 1610b, and 1610c, and 1620a, 1620b, and 1620c. Referring to FIG. 16, since the boundaries of the second coding units 1610a, 1610b, and 1610c determined when the first coding unit 1600 having a square shape is partitioned in a vertical direction do not partition the width of the first coding unit 1600 into halves, it may be determined that the first coding unit 1600 does not satisfy the condition of being processable in a certain order. Also, since the boundaries of the second coding units 1620a, 1620b, and 1620c determined when the first coding unit 1600 having a square shape is partitioned in a horizontal direction do not partition the height of the first coding unit 1600 into halves, it may be determined that the first coding unit 1600 does not satisfy the condition of being processable in a certain order. The image decoding apparatus 100 may determine disconnection of a scan order when the condition is not satisfied, and determine that the first coding unit 1600 is partitioned into the odd number of coding units based on a result of the determination. According to an embodiment, the image decoding apparatus 100 may set a certain limit on a coding unit at a certain location from among an odd number of coding units obtained by partitioning a coding unit, and since such a limit or certain location has been described above through various embodiments, details thereof are not provided again.

According to an embodiment, the image decoding apparatus 100 may determine coding units having various shapes by partitioning a first coding unit.

Referring to FIG. 16, the image decoding apparatus 100 may partition the first coding unit 1600 having a square shape and a first coding unit 1630 or 1650 having a non-square shape into coding units having various shapes.

Figure 17:
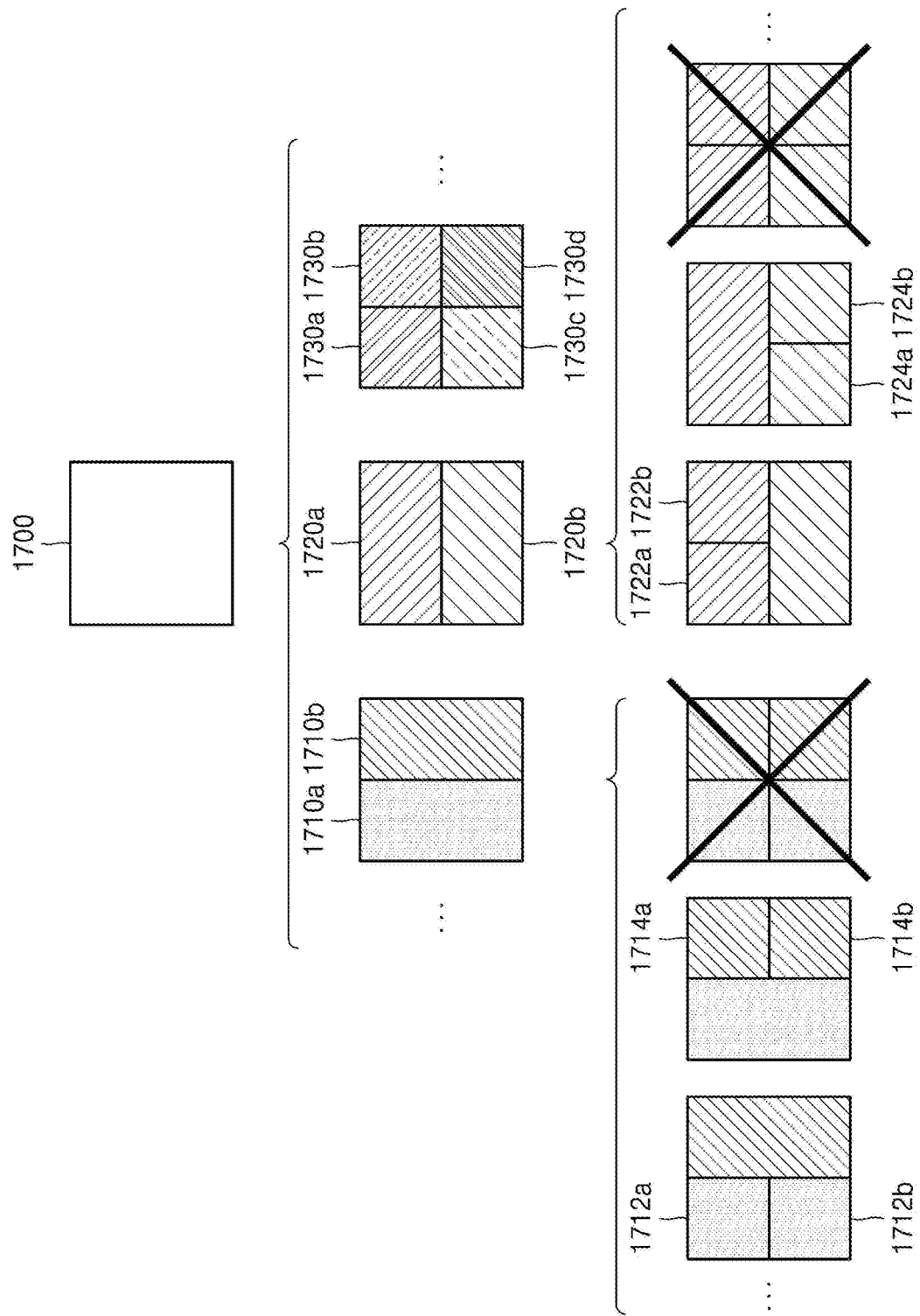
FIG. 17 illustrates that a shape into which a second coding unit is partitionable is restricted when the second coding unit having a non-square shape determined when a first coding unit is partitioned satisfies a certain condition, according to an embodiment.

FIG. 17 illustrates that a shape into which a second coding unit is partitionable by the image decoding apparatus 100 is restricted when the second coding unit having a non-square shape determined when a first coding unit 1700 is partitioned satisfies a certain condition, according to an embodiment.

According to an embodiment, the image decoding apparatus 100 may determine that the first coding unit 1700 having a square shape is partitioned into second coding units 1710a and 1710b or 1720a and 1720b having a non-square shape, based on at least one of block shape information and partition shape information obtained through an obtainer. The second coding units 1710a and 1710b or 1720a and 1720b may be independently partitioned. Accordingly, the image decoding apparatus 100 may determine that the second coding units 1710a and 1710b or 1720a and 1720b are partitioned into a plurality of coding units or are not partitioned based on at least one of block shape information and partition shape information related to each of the coding units 1710a and 1710b or 1720a and 1720b. According to an embodiment, the image decoding apparatus 100 may determine third coding units 1712a and 1712b by partitioning, in a horizontal direction, the second coding unit 1710a at the left having a non-square shape, which is determined when the first coding unit 1700 is partitioned in a vertical direction. However, when the second coding unit 1710a at the left is partitioned in the horizontal direction, the image decoding apparatus 100 may set a limit that the second coding unit 1710b at the right is not partitioned in the horizontal direction like the second coding unit 1710a at the left. When third coding units 1714a and 1714b are determined when the second coding unit 1710b at the right is partitioned in the same direction, i.e., the horizontal direction, the third coding units 1712a, 1712b, 1714a, and 1714b are determined when the second coding units 1710a at the left and the second coding unit 1710b at the right are each independently partitioned in the horizontal direction. However, this is the same result as partitioning the first coding unit 1700 into four second coding units 1730a, 1730b, 1730c, and 1730d having a square shape based on at least one of block shape information and partition shape information, and thus may be inefficient in terms of image decoding.

According to an embodiment, the image decoding apparatus 100 may determine third coding units 1722a and 1722b or 1724a, and 1724b by partitioning, in a vertical direction, the second coding unit 1720a or 1720b having a non-square shape determined when the first coding unit 1700 is partitioned in the horizontal direction. However, when one of second coding units (for example, the second coding unit 1720a at the top) is partitioned in a vertical direction, the image decoding apparatus 100 may set a limit that the other second coding unit (for example, the second coding unit 1720b at the bottom) is not partitioned in the vertical direction like the second coding unit 1720a at the top for the above described reasons.

Figure 18:
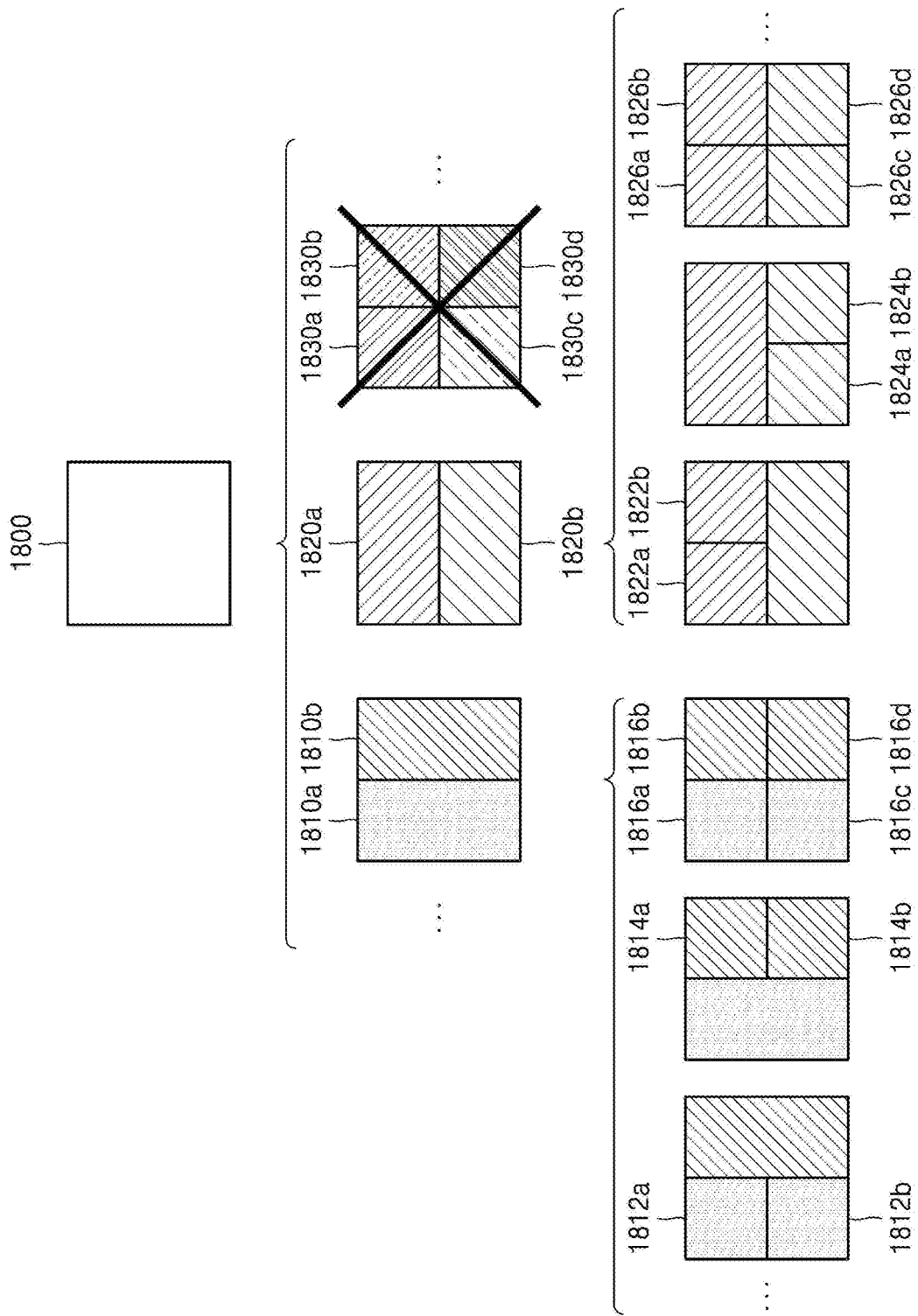
FIG. 18 illustrates processes of partitioning a coding unit having a square shape when partition shape information is unable to indicate that a coding unit is partitioned into four square shapes, according to an embodiment.

FIG. 18 illustrates processes of the image decoding apparatus 100 partitioning a coding unit having a square shape when partition shape information is unable to indicate that a coding unit is partitioned into four square shapes, according to an embodiment.

According to an embodiment, the image decoding apparatus 100 may determine second coding units 1810a and 1810b, or 1820a and 1820b, by partitioning a first coding unit 1800 based on at least one of block shape information and partition shape information. Partition shape information may include information about various shapes into which a coding unit may be partitioned, but such information about various shapes may not include information for partitioning a coding unit into four square coding units. According to such partition shape information, the image decoding apparatus 100 is unable to partition the first coding unit 1800 having a square shape into four second coding units 1830a, 1830b, 1830c, and 1830d having a square shape. The image decoding apparatus 100 may determine the second coding units 1810a and 1810b, or 1820a and 1820b having a non-square shape based on the partition shape information.

According to an embodiment, the image decoding apparatus 100 may independently partition each of the second coding units 1810a and 1810b, or 1820a and 1820b having a non-square shape. Each of the second coding units 1810a and 1810b, or 1820a and 1820b may be partitioned in a certain order via a recursive method that may be a partitioning method corresponding to a method of partitioning the first coding unit 1800 based on at least one of the block shape information and the partition shape information.

For example, the image decoding apparatus 100 may determine third coding units 1812a and 1812b having a square shape by partitioning the second coding unit 1810a at the left in a horizontal direction, or determine third coding units 1814a and 1814b having a square shape by partitioning the second coding unit 1810b at the right in a horizontal direction. In addition, the image decoding apparatus 100 may determine third coding units 1816a through 1816d having a square shape by partitioning both the second coding unit 1810a at the left and the second coding unit 1810b at the right in the horizontal direction. In this case, coding units may be determined in the same manner as when the first coding unit 1800 is partitioned into four second coding units 1830a through 1830d having a square shape.

As another example, the image decoding apparatus 100 may determine third coding units 1822a and 1822b having a square shape by partitioning the second coding unit 1820a at the top in a vertical direction, and determine third coding units 1824a and 1824b having a square shape by partitioning the second coding unit 1820b at the bottom in a vertical direction. In addition, the image decoding apparatus 100 may determine third coding units 1822a, 1822b, 1824a, and 1824b having a square shape by partitioning both the second coding unit 1820a at the top and the second coding unit 1820b at the bottom in the vertical direction. In this case, coding units may be determined in the same manner as when the first coding unit 1800 is partitioned into four second coding units 1830a, 1830b, 1830c, and 1830d having a square shape.

Figure 19:
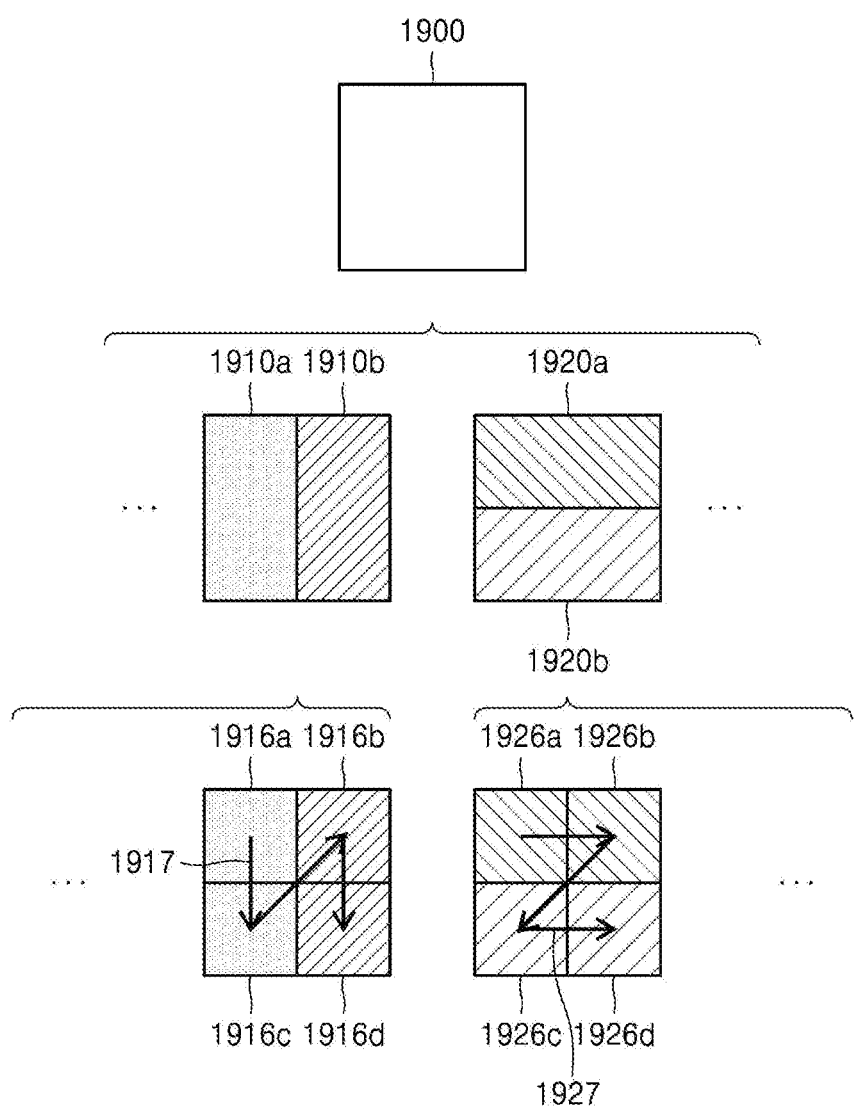
FIG. 19 illustrates that an order of processing a plurality of coding units may be changed according to processes of partitioning a coding unit, according to an embodiment.

FIG. 19 illustrates that an order of processing a plurality of coding units may be changed according to processes of partitioning a coding unit, according to an embodiment.

According to an embodiment, the image decoding apparatus 100 may partition a first coding unit 1900 based on block shape information and partition shape information. When the block shape information indicates a square shape and the partition shape information indicates that the first coding unit 1900 is partitioned in at least one of a horizontal direction and a vertical direction, the image decoding apparatus 100 may partition the first coding unit 1900 to determine second coding units 1910a and 1910b, 1920a and 1920b. Referring to FIG. 19, the second coding units 1910a and 1910b, or 1920a and 1920b having a non-square shape and determined when the first coding unit 1900 is partitioned in the horizontal direction or the vertical direction may each be independently partitioned based on block shape information and partition shape information. For example, the image decoding apparatus 100 may determine third coding units 1916a, 1916b, 1916c, and 1916d by partitioning, in the horizontal direction, each of the second coding units 1910a and 1910b generated as the first coding unit 1900 is partitioned in the vertical direction, or determine third coding units 1926a, 1926b, 1926c, and 1926d by partitioning, in the vertical direction, the second coding units 1920a and 1920b generated as the first coding unit 1900 is partitioned in the vertical direction. Processes of partitioning the second coding units 1910a and 1910b, or 1920a and 1920b have been described above with reference to FIG. 17, and thus details thereof are not provided again.

According to an embodiment, the image decoding apparatus 100 may process coding units according to a certain order. Features about processing coding units according to a certain order have been described above with reference to FIG. 14, and thus details thereof are not provided again. Referring to FIG. 19, the image decoding apparatus 100 may determine four third coding units 1916a, 1916b, 1916c, and 1916d or 1926a, 1926b, 1926c, and 1926d having a square shape by partitioning the first coding unit 1900 having a square shape. According to an embodiment, the image decoding apparatus 100 may determine an order of processing the third coding units 1916a, 1916b, 1916c, and 1916d or 1926a, 1926b, 1926c, and 1926d based on how the first coding unit 1900 is partitioned.

According to an embodiment, the image decoding apparatus 100 may determine the third coding units 1916a, 1916b, 1916c, and 1916d by partitioning, in the horizontal direction, the second coding units 1910a and 1910b generated as the first coding unit 1900 is partitioned in the vertical direction, and process the third coding units 1916a, 1916b, 1916c, and 1916d according to an order 1917 of first processing, in the vertical direction, the third coding units 1916a and 1916c included in the second coding unit 1910a at the left, and then processing, in the vertical direction, the third coding units 1916b and 1916d included in the second coding unit 1910b at the right.

According to an embodiment, the image decoding apparatus 100 may determine the third coding units 1926a through 1926d by partitioning, in the vertical direction, the second coding units 1920a and 1920b generated as the first coding unit 1900 is partitioned in the horizontal direction, and process the third coding units 1926a through 1926d according to an order 1927 of first processing, in the horizontal direction, the third coding units 1926a and 1926b included in the second coding unit 1920a at the top, and then processing, in the horizontal direction, the third coding units 1926c and 1926d included in the second coding unit 1920b at the bottom.

Referring to FIG. 19, the third coding units 1916a through 1916d or 1926a through 1926d having a square shape may be determined when the second coding units 1910a and 1910b, or 1920a and 1920b are each partitioned. The second coding units 1910a and 1910b determined when the first coding unit 1900 is partitioned in the vertical direction and the second coding units 1920a and 1920b determined when the first coding unit 1900 is partitioned in the horizontal direction are partitioned in different shapes, but according to the third coding units 1916a through 1916d and 1926a through 1926d determined afterwards, the first coding unit 1900 is partitioned in coding units having same shapes. Accordingly, the image decoding apparatus 100 may process pluralities of coding units determined in same shapes in different orders even when the coding units having the same shapes are consequently determined when coding units are recursively partitioned through different processes based on at least one of block shape information and partition shape information.

FIG. 20 illustrates processes of determining a depth of a coding unit as a shape and size of the coding unit are changed, when a plurality of coding units are determined as the coding unit is recursively partitioned, according to an embodiment.

According to an embodiment, the image decoding apparatus 100 may determine a depth of a coding unit according to a certain standard. For example, the certain standard may be a length of a long side of the coding unit. When a length of a long side of a current coding unit is partitioned by 2n times shorter than a length of a long side of a coding unit before partition, it may be determined that a depth of the current coding unit is increased by n times than a depth of the coding unit before partition, wherein n>0. Hereinafter, a coding unit having an increased depth is referred to as a coding unit of a lower depth.

Referring to FIG. 20, the image decoding apparatus 100 may determine a second coding unit 2002 and a third coding unit 2004 of lower depths by partitioning a first coding unit 2000 having a square shape, based on block shape information indicating a square shape (for example, block shape information may indicate '0:SQUARE'), according to an embodiment. When a size of the first coding unit 2000 having a square shape is 2N×2N, the second coding unit 2002 determined by partitioning a width and a height of the first coding unit 2000 by ½¹ may have a size of N×N. In addition, the third coding unit 2004 determined by partitioning a width and a height of the second coding unit 2002 by ½ may have a size of N/2×N/2. In this case, a width and a height of the third coding unit 2004 corresponds to ½² of the first coding unit 2000. When a depth of the first coding unit 2000 is D, a depth of the second coding unit 2002 having ½¹ of the width and the height of the first coding unit 2000 may be D+1, and a depth of the third coding unit 2004 having ½² of the width and the height of the first coding unit 2000 may be D+2.

According to an embodiment, the image decoding apparatus 100 may determine a second coding unit 2012 or 2022 and a third coding unit 2014 or 2024 by partitioning a first coding unit 2010 or 2020 having a non-square shape, based on block shape information indicating a non-square shape (for example, block shape information may indicate '1:NS_VER' indicating a non-square shape in which a height is longer than a width, or '2:NS_HOR' indicating a non-square shape in which a width is longer than a height), according to an embodiment.

The image decoding apparatus 100 may determine a second coding unit (for example, the second coding unit 2002, 2012, or 2022) by partitioning at least one of a width and a height of the first coding unit 2010 having a size of N×2N. That is, the image decoding apparatus 100 may determine the second coding unit 2002 having a size of N×N or the second coding unit 2022 having a size of N×N/2 by partitioning the first coding unit 2010 in a horizontal direction, or determine the second coding unit 2012 having a size of N/2×N by partitioning the first coding unit 2010 in horizontal and vertical directions.

According to an embodiment, the image decoding apparatus 100 may determine a second coding unit (for example, the second coding unit 2002, 2012, or 2022) by partitioning at least one of a width and a height of the first coding unit 2020 having a size of 2N×N. That is, the image decoding apparatus 100 may determine the second coding unit 2002 having a size of N×N or the second coding unit 2012 having a size of N/2×N by partitioning the first coding unit 200 in a vertical direction, or determine the second coding unit 2022 having a size of N×N/2 by partitioning the first coding unit 2010 in horizontal and vertical directions.

According to an embodiment, the image decoding apparatus 100 may determine a third coding unit (for example, the third coding unit 2004, 2014, or 2024) by partitioning at least one of a width and a height of the second coding unit 2002 having a size of N×N. That is, the image decoding apparatus 100 may determine the third coding unit 2004 having a size of N/2×N/2, the third coding unit 2014 having a size of N/2²×N/2, or the third coding unit 2024 having a size of N/2×N/2² by partitioning the second coding unit 2002 in vertical and horizontal directions.

According to an embodiment, the image decoding apparatus 100 may determine a third coding unit (for example, the third coding unit 2004, 2014, or 2024) by partitioning at least one of a width and a height of the second coding unit 2012 having a size of N/2×N. That is, the image decoding apparatus 100 may determine the third coding unit 2004 having a size of N/2×N/2 or the third coding unit 2024 having a size of N/2×N/2² by partitioning the second coding unit 2012 in a horizontal direction, or the third coding unit 2014 having a size of N/2²×N/2 by partitioning the second coding unit 2012 in vertical and horizontal directions.

According to an embodiment, the image decoding apparatus 100 may determine a third coding unit (for example, the third coding unit 2004, 2014, or 2024) by partitioning at least one of a width and a height of the second coding unit 2022 having a size of N×N/2. That is, the image decoding apparatus 100 may determine the third coding unit 2004 having a size of N/2×N/2 or the third coding unit 2014 having a size of N/2²×N/2 by partitioning the second coding unit 2022 in a vertical direction, or the third coding unit 2024 having a size of N/2×N/2² by partitioning the second coding unit 2022 in vertical and horizontal directions.

According to an embodiment, the image decoding apparatus 100 may partition a coding unit (for example, the first, second, or third coding unit 2000, 2002, or 2004) having a square shape in a horizontal or vertical direction. For example, the first coding unit 2010 having a size of N×2N may be determined by partitioning the first coding unit 2000 having a size of 2N×2N in the vertical direction, or the first coding unit 2020 having a size of 2N×N may be determined by partitioning the first coding unit 2000 in the horizontal direction. According to an embodiment, when a depth is determined based on a length of a longest side of a coding unit, a depth of a coding unit determined as the first coding unit 2000 having a size of 2N×2N is partitioned in a horizontal or vertical direction may be the same as a depth of the first coding unit 2000.

According to an embodiment, the width and the height of the third coding unit 2014 or 2024 may be ½² of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is ½² of the width and the height of the first coding unit 2010 or 2020 may be D+2.

Figure 21:
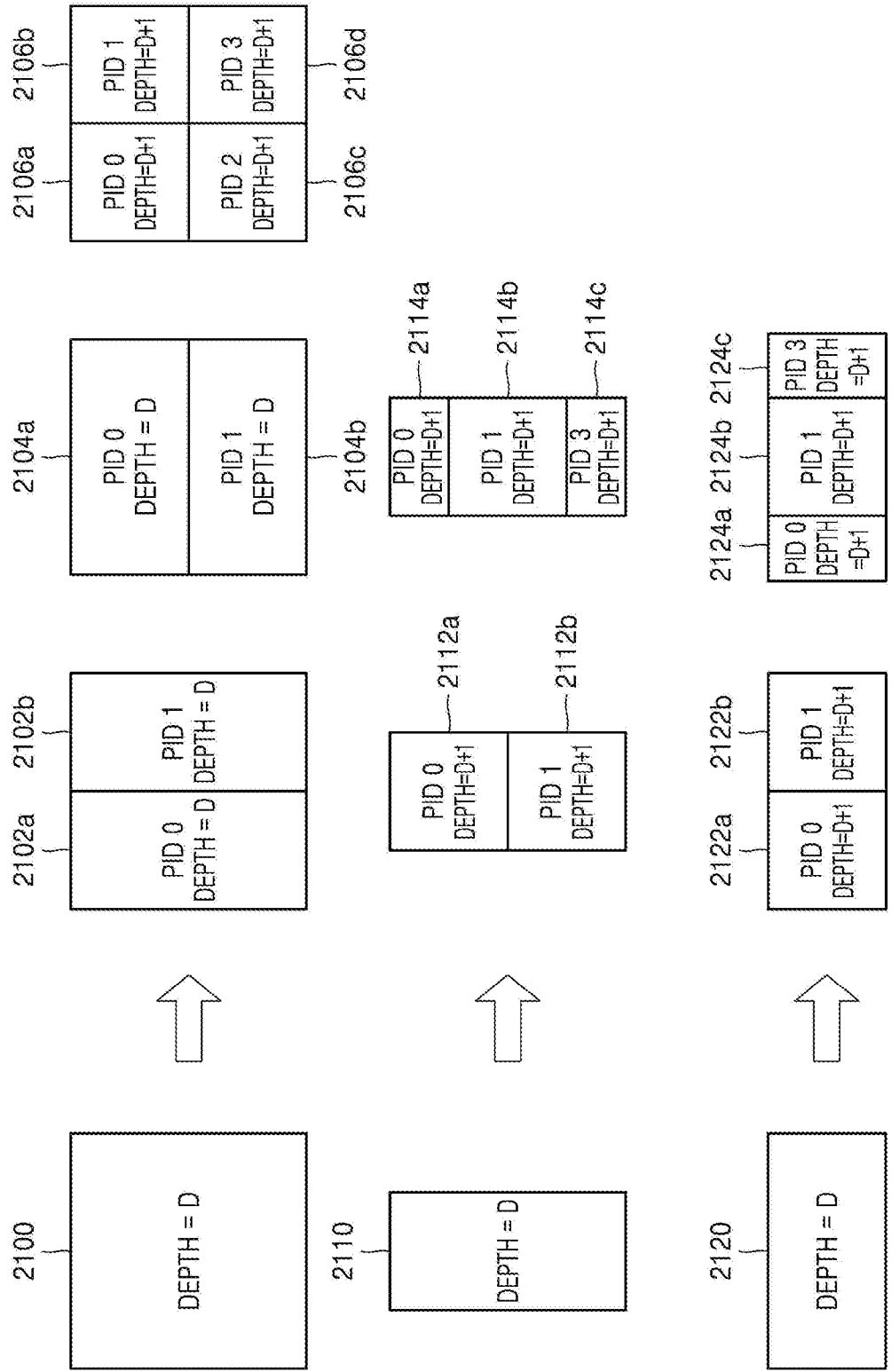
FIG. 21 illustrates a part index (PID) for distinguishing depths and coding units, which may be determined according to shapes and sizes of coding units, according to an embodiment.

FIG. 21 illustrates a part index (PID) for distinguishing depths and coding units, which may be determined according to shapes and sizes of coding units, according to an embodiment.

According to an embodiment, the image decoding apparatus 100 may determine a second coding unit having various shapes by partitioning a first coding unit 2100 having a square shape. Referring to FIG. 21, the image decoding apparatus 100 may determine second coding units 2102a and 2102b, 2104a and 2104b, or 2106a, 2106b, 2106c, and 2106d by partitioning the first coding unit 2100 in at least one of a vertical direction and a horizontal direction, according to partition shape information. That is, the image decoding apparatus 100 may determine the second coding units 2102a and 2102b, 2104a and 2104b, or 2106a, 2106b, 2106c, and 2106d, based on partition shape information of the first coding unit 2100.

According to an embodiment, a depth of the second coding units 2102a and 2102b, 2104a and 2104b, or 2106a, 2106b, 2106c, and 2106d determined according to the partition shape information of the first coding unit 2100 having a square shape may be determined based on a length of a long side. For example, because a length of one side of the first coding unit 2100 having a square shape is the same as a length of a long side of the second coding units 2102a and 2102b or 2104a and 2104b having a non-square shape, the depths of the first coding unit 2100 and the second coding units 2102a and 2102b or 2104a and 2104b having a non-square shape may be the same, i.e., D. On the other hand, when the image decoding apparatus 100 partitions the first coding unit 2100 into the four second coding units 2106a, 2106b, 2106c, and 2106d having a square shape, based on the partition shape information, a length of one side of the second coding units 2106a, 2106b, 2106c, and 2106d having a square shape is ½ of the length of one side of the first coding unit 2100, the depths of the second coding units 2106a, 2106b, 2106c, and 2106d may be D+1, i.e., a depth lower than the depth D of the first coding unit 2100.

According to an embodiment, the image decoding apparatus 100 may partition a first coding unit 2110, in which a height is longer than a width, in a horizontal direction into a plurality of second coding units 2112a and 2112b or 2114a, 2114b, and 2114c, according to partition shape information. According to an embodiment, the image decoding apparatus 100 may partition a first coding unit 2120, in which a width is longer than a height, in a vertical direction into a plurality of second coding units 2122a and 2122b or 2114a, 2114b, and 2114c, according to partition shape information.

According to an embodiment, depths of the second coding units 2112a and 2112b, 2114a, 2114b, and 2114c, 2122a and 2122b, or 2124a, 2124b, and 2124c determined according to the partition shape information of the first coding unit 2110 or 2120 having a non-square shape may be determined based on a length of a long side. For example, because a length of one side of the second coding units 2112a and 2112b having a square shape is ½ of a length of a long side of the first coding unit 2110 having a non-square shape, in which the height is longer than the width, the depths of the second coding units 2112a and 2112b are D+1, i.e., depths lower than the depth D of the first coding unit 2110 having a non-square shape.

In addition, the image decoding apparatus 100 may partition the first coding unit 2110 having a non-square shape into an odd number of second coding units or 2114a, 2114b, and 2114c, based on partition shape information. The odd number of second coding units or 2114a, 2114b, and 2114c may include the second coding units 2114a and 2114c having a non-square shape, and the second coding unit 2114b having a square shape. In this case, because a length of a long side of the second coding units 2114a and 2114c having a non-square shape and a length of one side of the second coding unit 2114b having a square shape are ½ of a length of one side of the first coding unit 2110, depths of the second coding units or 2114a, 2114b, and 2114c may be D+1, i.e., a depth lower than the depth D of the first coding unit 2110. The image decoding apparatus 100 may determine depths of coding units related to the first coding unit 2110 having a non-square shape in which a width is longer than a height, in the same manner as determining depths of coding units related to the first coding unit 2110.

According to an embodiment, with respect to determining PIDs for distinguishing coding units, when an odd number of coding units do not have the same size, the image decoding apparatus 100 may determine PIDs based on a size ratio of the coding units. Referring to FIG. 21, the second coding unit 2114b located at the center from the odd number of second coding units 2114a, 2114b, and 2114c may have the same width as the second coding units 2114a and 2114c, but have a height twice higher than those of the second coding units 2114a and 2114c. That is, the second coding unit 2114b located at the center may include two of the second coding units 2114a and 2114c. Accordingly, when the PID of the second coding unit 2114b located at the center is 1 according to a scan order, the PID of the second coding unit 2114c in a next order may be 3, the PID being increased by 2. That is, values of the PID may be discontinuous. According to an embodiment, the image decoding apparatus 100 may determine whether an odd number of coding units has the same sizes based on discontinuity of PID for distinguishing the coding units.

According to an embodiment, the image decoding apparatus 100 may determine whether a plurality of coding units determined as a current coding unit is partitioned have certain partition shapes based on values of PID. Referring to FIG. 21, the image decoding apparatus 100 may determine the even number of second coding units 2112a and 211b or the odd number of second coding units 2114a, 2114b, and 2114c by partitioning the first coding unit 2110 having a rectangular shape in which the height is longer than the width. The image decoding apparatus 100 may use the PID indicating each coding unit so as to distinguish a plurality of coding units. According to an embodiment, a PID may be obtained from a sample at a certain location (for example, an upper left sample) of each coding unit.

According to an embodiment, the image decoding apparatus 100 may determine a coding unit at a certain location from among coding units determined by using PIDs for distinguishing coding units. According to an embodiment, when partition shape information of the first coding unit 2110 having a rectangular shape in which a height is longer than a width indicates that the first coding unit 2110 is partitioned into three coding units, the image decoding apparatus 100 may partition the first coding unit 2110 into the three second coding units 2114a, 2114b, and 2114c. The image decoding apparatus 100 may assign a PID to each of the three second coding units 2114a, 2114b, and 2114c. The image decoding apparatus 100 may compare PIDs of an odd number of coding units so as to determine a center coding unit from among the coding units. The image decoding apparatus 100 may determine, as a coding unit at a center location from among coding units determined as the first coding unit 2110 is partitioned, the second coding unit 2114b having a PID corresponding to a center value from among PIDs, based on PIDs of the coding units. According to an embodiment, while determining PIDs for distinguishing coding units, when the coding units do not have the same sizes, the image decoding apparatus 100 may determine PIDs based on a size ratio of the coding units. Referring to FIG. 21, the second coding unit 2114b generated as the first coding unit 2110 is partitioned may have the same width as the second coding units 2114a and 2114c, but may have the height twice higher than those of the second coding units 2114a and 2114c. In this case, when the PID of the second coding unit 2114b located at the center is 1, the PID of the second coding unit 2114c in a next order may be 3, the PID increased by 2. As such, when an increasing range of PIDs differs while uniformly increasing, the image decoding apparatus 100 may determine that a current coding unit is partitioned into a plurality of coding units including a coding unit having a different size from other coding units. According to an embodiment, when partition shape information indicates partition into an odd number of coding units, the image decoding apparatus 100 may partition a current coding unit into a plurality of coding units, in which a coding unit at a certain location (for example, a center coding unit) have a size different from other coding units. In this case, the image decoding apparatus 100 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the image decoding apparatus 100 may use a certain data unit from which recursive partition of a coding unit is started.

Figure 22:
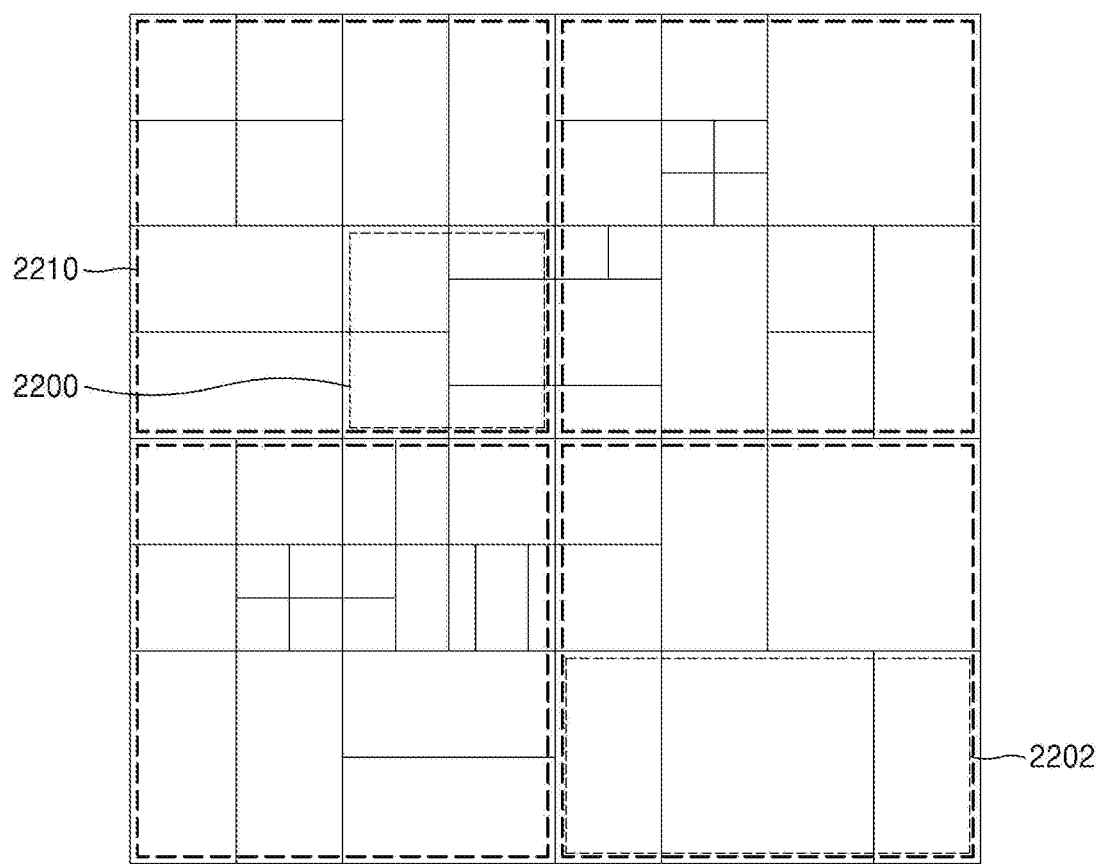
FIG. 22 illustrates that a plurality of coding units are determined according to a plurality of certain data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively partitioned by using at least one of block shape information and partition shape information. That is, the certain data unit may correspond to a coding unit of an uppermost depth used while determining a plurality of coding units by partitioning a current picture. Hereinafter, the certain data unit is referred to as a reference data unit for convenience of description.

According to an embodiment, the reference data unit may indicate a certain size and shape. According to an embodiment, a reference coding unit may include M×N samples. Here, M and N may be the same, and may be an integer expressed as a multiple of 2. That is, the reference data unit may indicate a square shape or a non-square shape, and may later be partitioned into an integer number of coding units.

According to an embodiment, the image decoding apparatus 100 may partition a current picture into a plurality of reference data units. According to an embodiment, the image decoding apparatus 100 may partition the plurality of reference data units obtained by partitioning the current picture by using partitioning information about each of the reference data units. Partitioning processes of such reference data units may correspond to partitioning processes using a quad-tree structure.

According to an embodiment, the image decoding apparatus 100 may pre-determine a smallest size available for the reference data unit included in the current picture. Accordingly, the image decoding apparatus 100 may determine the reference data unit having various sizes that are equal to or larger than the smallest size, and determine at least one coding unit based on the determined reference data unit by using block shape information and partition shape information.

Referring to FIG. 22, the image decoding apparatus 100 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the obtainer of the image decoding apparatus 100 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of partitioning the current coding unit 1000 of FIG. 10, and processes of determining at least one coding unit included in the reference coding unit 2202 having a non-square shape have been described above through processes of partitioning the current coding unit 1100 or 1150 of FIG. 11, and thus details thereof are not provided again.

According to an embodiment, in order to determine a size and shape of a reference coding unit according to some data units pre-determined based on a predetermined condition, the image decoding apparatus 100 may use a PID for distinguishing the size and shape of the reference coding unit. That is, the obtainer may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding apparatus 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. That is, the image decoding apparatus 100 may select at least one of the pre-determined size and shape of the reference coding unit according to the PID so as to determine at least one of the size and shape of the reference coding unit included in a data unit that is a criterion for obtaining the PID.

According to an embodiment, the image decoding apparatus 100 may use at least one reference coding unit included in one largest coding unit. That is, a largest coding unit partitioning an image may include at least one reference coding unit, and a coding unit may be determined when each of the reference coding unit is recursively partitioned. According to an embodiment, at least one of a width and height of the largest coding unit may be an integer times at least one of a width and height of the reference coding unit. According to an embodiment, a size of a reference coding unit may be equal to a size of a largest coding unit, which is partitioned n times according to a quad-tree structure. In other words, the image decoding apparatus 100 may determine a reference coding unit by partitioning a largest coding unit n times according to a quad-tree structure, and partition the reference coding unit based on at least one of block shape information and partition shape information according to various embodiments.

Figure 23:
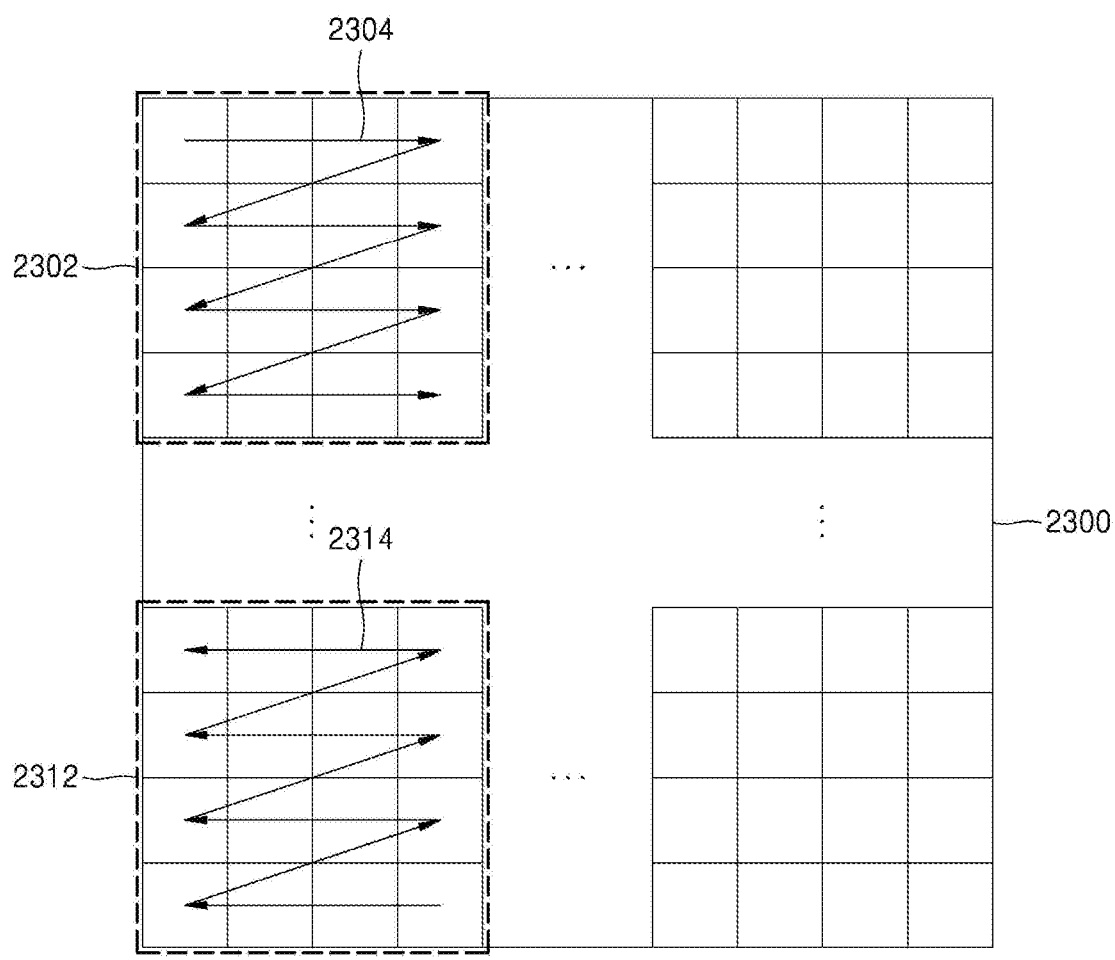
FIG. 23 illustrates a processing block serving as a criterion of determining a determination order of at least one reference coding units included in a picture, according to an embodiment.

FIG. 23 illustrates a processing block serving as a criterion of determining a determination order of reference coding units included in a picture 2300, according to an embodiment.

According to an embodiment, the image decoding apparatus 100 may determine at least one processing block partitioning a picture. A processing block is a data unit including at least one reference coding unit partitioning an image, and the at least one reference coding unit included in the processing block may be determined in a certain order. In other word, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to an embodiment, the image decoding apparatus 100 may determine a size of at least one processing block included in an image by obtaining information about a size of a processing block. The image decoding apparatus 100 may obtain, from a bitstream, the information about a size of a processing block to determine the size of the at least one processing block included in the image. The size of the processing block may be a certain size of a data unit indicated by the information about a size of a processing block.

According to an embodiment, the obtainer of the image decoding apparatus 100 may obtain, from the bitstream, the information about a size of a processing block according to certain data units. For example, the information about a size of a processing block may be obtained from the bitstream in data units of images, sequences, pictures, slices, and slice segments. That is, the obtainer may obtain, from the bitstream, the information about a size of a processing block according to such several data units, and the image decoding apparatus 100 may determine the size of at least one processing block partitioning the picture by using the obtained information about a size of a processing block, wherein the size of the processing block may be an integer times a size of a reference coding unit.

According to an embodiment, the image decoding apparatus 100 may determine sizes of processing blocks 2302 and 2312 included in the picture 2300. For example, the image decoding apparatus 100 may determine a size of a processing block based on information about a size of a processing block, the information obtained from a bitstream. Referring to FIG. 23, the image decoding apparatus 100 may determine horizontal sizes of the processing blocks 2302 and 2312 to be four times a horizontal size of a reference coding unit, and a vertical size thereof to be four times a vertical size of the reference coding unit, according to an embodiment. The image decoding apparatus 100 may determine a determining order of at least one reference coding unit in at least one processing block.

According to an embodiment, the image decoding apparatus 100 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining of a size of the reference coding unit.

According to an embodiment, the image decoding apparatus 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. That is, an order of determining reference coding units may be independently determined per processing block.

According to an embodiment, the image decoding apparatus 100 may obtain, from a bitstream, information about a determining order of a reference coding unit according to certain data units. For example, the obtainer may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the image decoding apparatus 100 may determine at least one reference coding unit based on the determined order.

According to an embodiment, the obtainer may obtain, from the bitstream, information about a determining order of a reference coding unit, as information related to the processing blocks 2302 and 2312, and the image decoding apparatus 100 may determine an order of determining at least one reference coding unit included in the processing blocks 2302 and 2312 and determine at least one reference coding unit included in the picture 2300 according to a determining order of a coding unit. Referring to FIG. 23, the image decoding apparatus 100 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand, when the determining order 2314 related to the processing block 2312 is an inverse order of a raster scan order, reference coding units included in the processing block 2312 may be determined in the inverse order of the raster scan order.

The image decoding apparatus 100 may decode determined at least one reference coding unit, according to an embodiment. The image decoding apparatus 100 may decode an image based on reference coding units determined through above embodiments. Examples of a method of decoding a reference coding unit may include various methods of decoding an image.

According to an embodiment, the image decoding apparatus 100 may obtain, from a bitstream, and use block shape information indicating a shape of a current coding unit or partition shape information indicating a method of partitioning the current coding unit. The block shape information or the partition shape information may be included in a bitstream related to various data units. For example, the image decoding apparatus 100 may use the block shape information or partition shape information, which is included in a sequence parameter set, a picture parameter set, a video parameter set, a slice header, and a slice segment header. In addition, the image decoding apparatus 100 may obtain, from a bitstream, and use syntax corresponding to the block shape information or the partition shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. A method of decoding an image, the method comprising:
   partitioning the image into at least one coding unit;
   partitioning a current coding unit into at least one transform unit;
   when a difference between scan positions of a final effective transform coefficient and an initial effective transform coefficient of a sub-block of a current transform unit is greater than a threshold value, determining an intra-prediction direction of the current coding unit by using parity of the sum of effective transform coefficients of the sub-block corresponding to certain scan positions; and
   when the difference is equal to or less than the threshold value, obtaining a syntax element indicating the intra-prediction direction from a bitstream.

2. The method of claim 1, wherein the sub-block is lastly scanned among at least one sub-block included in the current transform unit.

3. The method of claim 1, wherein the current transform unit is a transform unit first decoded among the at least one transform unit partitioned from the current coding unit.

4. The method of claim 1, wherein the certain scan positions are determined based on an order of scanning transform coefficients included in the sub-block.

5. The method of claim 1, wherein, when the difference is greater than a first threshold value and a number of the effective transform coefficients of the sub-block is greater than a second threshold value, the intra-prediction direction is determined using the parity of the sum, and when the difference is equal to or less than the first threshold value or the number is equal to or less than the second threshold value, the syntax element indicating the intra-prediction direction is obtained from the bitstream.

6. The method of claim 1, wherein, when the difference is greater than the threshold value, part of the syntax element indicating the intra-prediction direction is determined using the parity of the sum, and a remaining part of the syntax element is obtained from the bitstream.

7. The method of claim 1, wherein, when the difference is greater than the threshold value, a part of the syntax element indicating the intra-prediction direction is determined using parity of the sum of effective transform coefficients of the sub-block corresponding to even-numbered scan positions, and a remaining part of the syntax element is determined using parity of the sum of effective transform coefficients of the sub-block corresponding to odd-numbered scan positions.

8. The method of claim 1, further comprising:
   when the difference is greater than the threshold value, determining a transformation type of the current transform unit by using the parity of the sum; and
   when the difference is equal to or greater than the threshold value, obtaining a syntax element indicating a transformation type of the current transform unit from the bitstream.

9. The method of claim 1, further comprising:
   when the difference is equal to or less than the threshold value, obtaining a syntax element indicating a sign of the initial effective transform coefficient of the sub-block from the bitstream; and
   when the difference is greater than threshold value, determining the sign of the initial effective transform coefficient by using the parity of the sum.

10. The method of claim 9, wherein the certain scan positions do not comprise the scan position of the initial effective transform coefficient.

11. The method of claim 9, wherein, when the difference is greater than the threshold value, the intra-prediction direction is determined using parity of the sum of effective transform coefficients of the sub-block corresponding to even-numbered scan positions, and the sign of the initial effective transform coefficient is determined using parity of the sum of effective transform coefficients of the sub-block corresponding to odd-numbered scan positions.

12. The method of claim 10, wherein, when the difference is greater than the threshold value, the sign of the initial effective transform coefficient is determined based on parity of a level of the initial effective transform coefficient.

13. An apparatus for decoding an image, the apparatus comprising:
   a decoder configured to partition an image into at least one coding unit, partition a current coding unit into at least one transform unit, and determine an intra-prediction direction of the current coding unit by using parity of the sum of transform coefficients of a sub-block of a current transform unit corresponding to certain scan positions when a difference between scan positions of a final effective transform coefficient and an initial effective transform coefficient of the sub-block of the current transform unit is greater than a threshold value; and
   a bitstream obtainer configured to obtain a syntax element indicating the intra-prediction direction from a bitstream when the difference is equal to or less than the threshold value.

14. A method of encoding an image, the method comprising:
   partitioning the image into at least one coding unit;
   partitioning a current coding unit into at least one transform unit;
   correcting a level of an effective transform coefficient among the at least one transform unit such that parity of the sum of transform coefficients of a sub-block of a current transform unit corresponding to certain scan positions indicates an intra-prediction direction of the current coding unit, when a difference between scan positions of a final effective transform coefficient and an initial effective transform coefficient of the sub-block of the current transform unit is greater than a threshold value; and generating a bitstream including a syntax element indicating the intra-prediction direction when the difference is equal to or less than the threshold value.

* * * * *